United States Patent
Umetani

(10) Patent No.: US 9,413,230 B2
(45) Date of Patent: Aug. 9, 2016

(54) POWER CONVERTER

(71) Applicant: DENSO CORPORATION, Kariya, Aichi-pref. (JP)

(72) Inventor: Kazuhiro Umetani, Nagoya (JP)

(73) Assignee: DENSO CORPORATION, Kariya (JP)

( * ) Notice: Subject to any disclaimer, the term of this patent is extended or adjusted under 35 U.S.C. 154(b) by 29 days.

(21) Appl. No.: 14/606,517

(22) Filed: Jan. 27, 2015

(65) Prior Publication Data

US 2015/0214848 A1 Jul. 30, 2015

(30) Foreign Application Priority Data

Jan. 30, 2014 (JP) .................................. 2014-15605

(51) Int. Cl.
| | | |
|---|---|---|
| *G05F 1/40* | (2006.01) | |
| *H02M 3/07* | (2006.01) | |
| *H02M 1/14* | (2006.01) | |
| *H02M 1/32* | (2007.01) | |
| *H02M 1/00* | (2006.01) | |
| *H02M 1/34* | (2007.01) | |
| *H02M 3/158* | (2006.01) | |

(52) U.S. Cl.
CPC . *H02M 3/07* (2013.01); *H02M 1/14* (2013.01); *H02M 1/32* (2013.01); *H02M 2001/009* (2013.01); *H02M 2001/346* (2013.01); *H02M 2003/071* (2013.01); *H02M 2003/072* (2013.01); *H02M 2003/1586* (2013.01); *Y02B 70/1491* (2013.01)

(58) Field of Classification Search
CPC ......... H02M 3/155; H02M 7/10; H02M 3/07; H02M 7/003; H02M 3/1584
USPC ........... 363/16–17, 65, 68, 71; 323/222, 224, 323/247, 271, 282–285
See application file for complete search history.

(56) References Cited

U.S. PATENT DOCUMENTS

| | | | | |
|---|---|---|---|---|
| 5,986,909 A | * | 11/1999 | Hammond | .............. H02M 7/49 363/37 |
| 6,853,171 B2 | * | 2/2005 | May | ...................... H02M 3/155 323/266 |

(Continued)

FOREIGN PATENT DOCUMENTS

| | | |
|---|---|---|
| JP | 7-123702 A | 5/1995 |
| JP | 9-093914 A | 4/1997 |

(Continued)

OTHER PUBLICATIONS

Pyosoo Kim et al., "High Step-up Interleaved Boost Converters Using Voltage Multiplier Cells", 8th International Conference on Power Electronics, pp. 2844-2851, May 30-Jun. 3, 2011, Jeju, Korea. (Discussed on pp. 1-2 of the specification).

*Primary Examiner* — Rajnikant Patel
(74) *Attorney, Agent, or Firm* — Posz Law Group, PLC

(57) ABSTRACT

In a power converter, at least two main current paths each including an inductor and a transistor are connected between input terminals, and at least two storage circuits each including capacitors are correspondingly connected to branch nodes of the main current paths. Diodes are connected between the storage circuits. The transistors of the main current paths are interleaved. When one of the transistors is turned off, a current flowing in the corresponding inductor flows into the corresponding storage circuit to turn on the diodes and to charge the capacitors of the corresponding storage circuit. When another one of the transistors is turned off, a current flowing in the corresponding inductor flows into the corresponding storage circuit to turn on the diodes and charge the capacitors of the corresponding storage circuit.

12 Claims, 26 Drawing Sheets

(56) References Cited

U.S. PATENT DOCUMENTS 8,773,874 B2 * 7/2014 Hasegawa ............ H02M 3/155 363/65
8,829,866 B2 * 9/2014 Lethellier ............... H02M 1/44 323/222

FOREIGN PATENT DOCUMENTS

| JP | 2002-233136 A | 8/2002 |
| JP | 2010-045943 A | 2/2010 |
| JP | 2013-128373 A | 6/2013 |

* cited by examiner

MODE 1

MODE 2

MODE 3

MODE 4

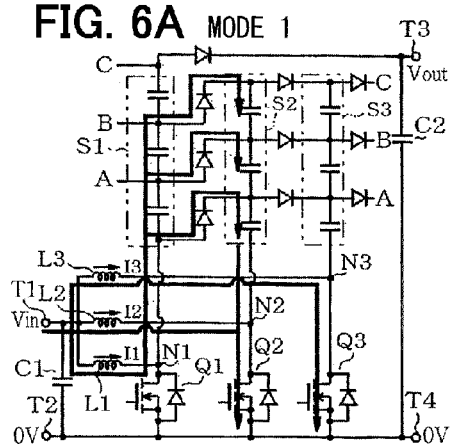
FIG. 6A MODE 1
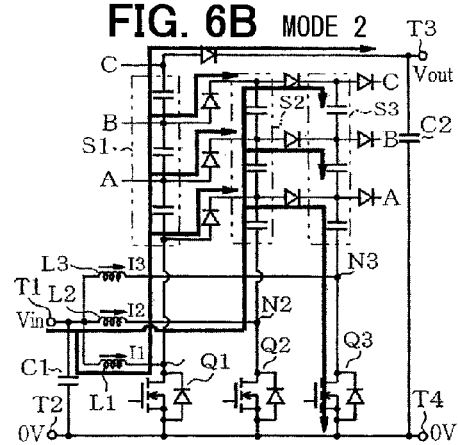
FIG. 6B MODE 2
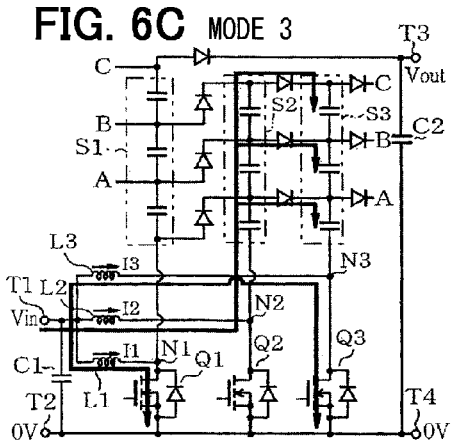
FIG. 6C MODE 3
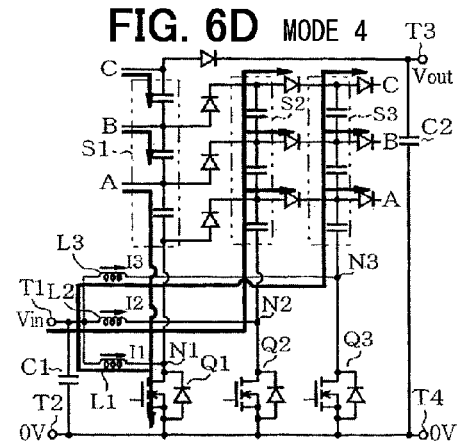
FIG. 6D MODE 4
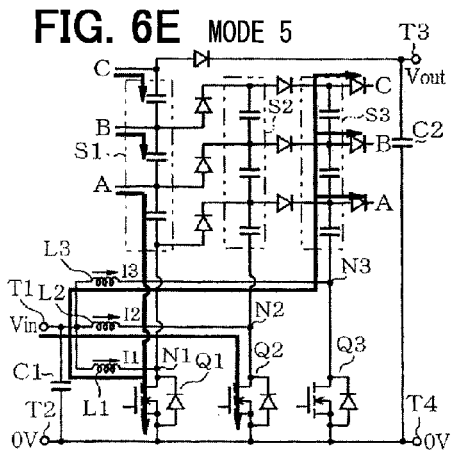
FIG. 6E MODE 5
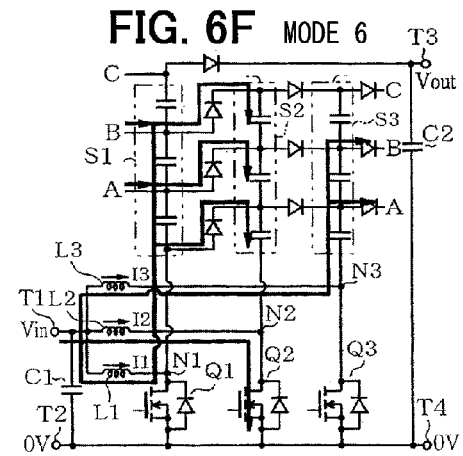
FIG. 6F MODE 6

MODE 1

MODES 2, 4, 6

MODE 3

MODE 5

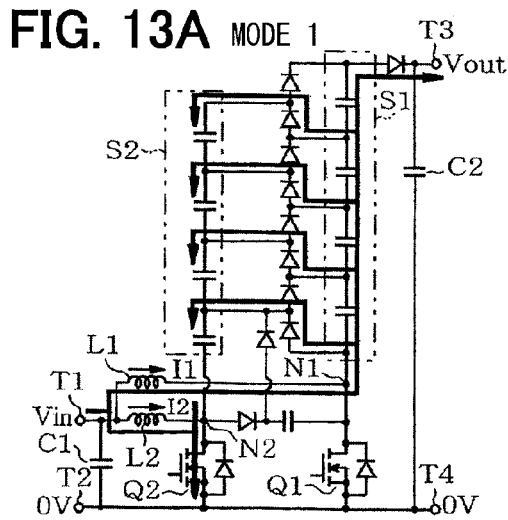
FIG. 13A MODE 1
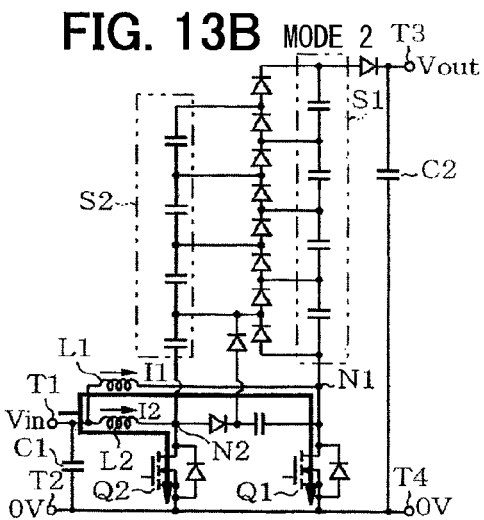
FIG. 13B MODE 2
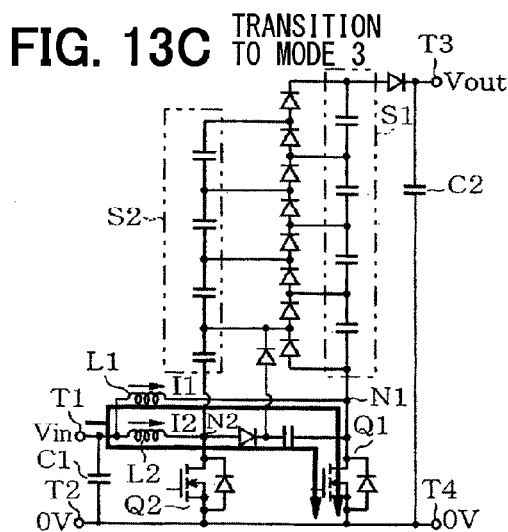
FIG. 13C TRANSITION TO MODE 3
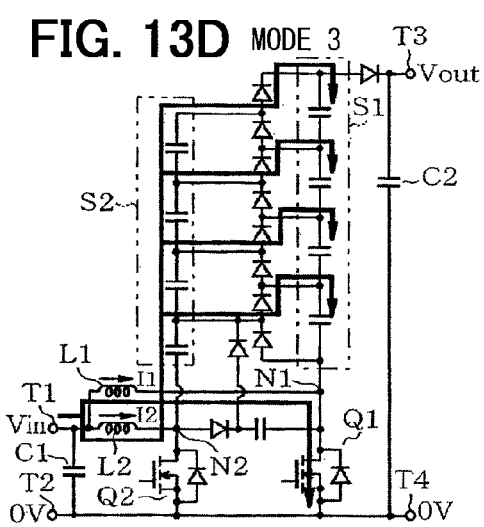
FIG. 13D MODE 3
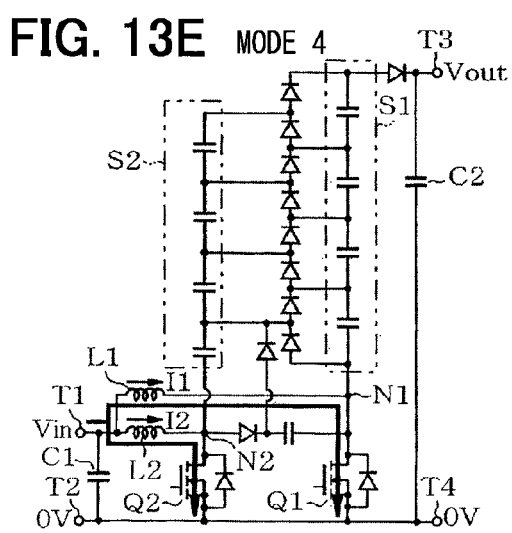
FIG. 13E MODE 4
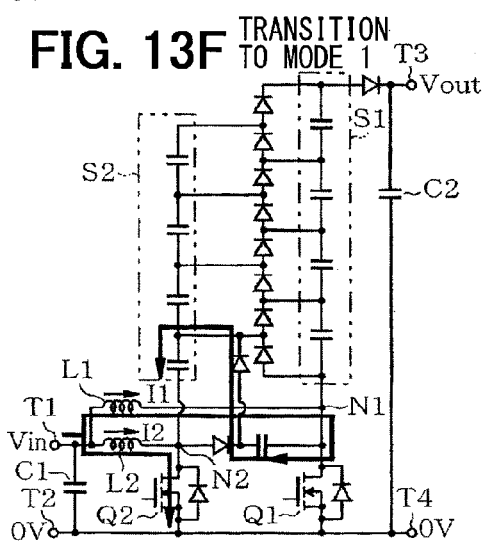
FIG. 13F TRANSITION TO MODE 1

MODE 1

MODES 2, 4

MODE 3

MODE 1

MODES 2, 4

MODE 3

POWER CONVERTER

CROSS REFERENCE TO RELATED APPLICATION

This application is based on Japanese Patent Application No. 2014-15605 filed on Jan. 30, 2014, the disclosure of which is incorporated herein by reference.

TECHNICAL FIELD

The present disclosure relates to a non-isolated power converter that boosts or bucks voltage.

BACKGROUND

An ignition system using electric discharge has been widely used for igniting an injected fuel in engines. In such an ignition system, a DC voltage is generated by boosting voltage of a storage battery, and is then further boosted to have a higher voltage value using a flyback transformer. The boosted voltage is guided to a spark plug and discharged, thereby to ignite the fuel.

In this case, when a high DC voltage can be obtained by boosting the voltage of the storage battery, a boost ratio of the flyback transformer can be set to a small value and thus a ratio of number of turns of a winding can be reduced. As a result, the number of turns of a secondary winding can be reduced, and the size of the flyback transformer can be reduced. Also, a conduction current of a primary winding can be reduced. Therefore, conduction loss of the flyback transformer can be reduced, resulting in an increase in efficiency.

A general boosting chopper circuit is made of a series circuit of an inductor and a switching element connected between input terminals, a capacitor connected between output terminals, and a diode that guides a current flowing in the inductor to an output side when the switching element is turned off. When a high boosting ratio is tried to obtain using the boosting chopper circuit, power loss is likely to increase, resulting in decrease in the efficiency.

For example, a non-patent literature 1 discloses a DC-DC converter that realizes a high boosting ratio. In the DC-DC converter, two systems of series circuits each made of an inductor and a switching element are provided between input terminals on a low-voltage side, and N-stages of voltage multiplier cells each made of a capacitor and a diode are provided between output terminals on a high-voltage side.

A connection node of the inductor and the switching element of one of the series circuits is directly connected to the voltage multiplier cell on the lowest stage. A connection node of the inductor and the switching element of the other of the series circuits is connected to the voltage multiplier cell on the lowest stage through an auxiliary capacitor.

In such a structure, a connection node between the auxiliary capacitor and the voltage multiplier cell serves as one of the output terminals, and a terminal of the voltage multiplier cell on a highest stage serves as the other of the output terminals. In the converter, because the two switches are interleaved according to drive signals having a phase difference of 180°, current ripples of the two inductors are cancelled. Therefore, inductance of the two inductors can be reduced, as compared with the general boosting chopper circuit mentioned above. As a result, the number of turns of the winding reduces, and the loss of the inductors reduces.

Further, the switch is applied with a low voltage, which has a value half of the value obtained by dividing an output voltage by the number of stages of the voltage multiplier cells at most. Therefore, the switching loss reduces, as compared with the general boosting chopper circuit mentioned above.

Non-patent Literature 1: P. Kim, S. Lee, J. Park, and S Choi, "High Step-up Interleaved Boost Converters Using Voltage Multiplier Cells", 8th International Conference on Power Electronics, pp. 2844-2851 (2011)

SUMMARY

It is an object of the present disclosure to provide a power converter an output terminal of which can be grounded and in which electric charge does not remain in a circuit when voltage between input terminals and voltage between output terminals are lowered.

According to a first aspect of the present disclosure, a power converter includes a pair of low-voltage terminals, a pair of high-voltage terminals, N systems of main current paths, a plurality of storage circuits, a plurality of sub restriction elements, a smoothing storage element, an end sub-restriction element, and a control circuit. The pair of low-voltage terminals includes a first low-voltage terminal and a second low-voltage terminal. The pair of high-voltage terminals includes a first high-voltage terminal and a second high-voltage terminal. The second high-voltage terminal is commonly connected to the second low-voltage terminal. The N systems of main current paths are disposed between the first low-voltage terminal and the second low-voltage terminal, in which N is an integer being 2 or more. Each of the main current paths includes a magnetic part storing magnetic energy and a main restriction element restricting a conduction current, the magnetic part and the main restriction element are connected in series to each other through a branch node.

The plurality of storage circuits is correspondingly provided for the main current paths. Each of the storage circuits includes one or more storage elements being stacked to one or more stages and being connected in series. Each of the storage circuits has a lower end being connected to the branch node of a corresponding one of the main current paths. Each of the plurality of sub restriction elements is connected between a terminal of the storage element of one of the storage circuits and a terminal of the storage element of another one of the storage circuits. The smoothing storage element is connected between the first high-voltage terminal and the second high-voltage terminal. The end sub-restriction element has an end connected to the first high-voltage terminal. The control circuit controls at least one of the main restriction elements, the sub restriction elements, and the end sub-restriction element.

The N systems of the main current paths and the storage circuits correspondingly connected to the main current paths are assigned with a sequential order from a first to an N-th. A lower terminal of the storage element of each stage of the first storage circuit is connected to an upper terminal of the storage element of a corresponding stage of the second storage circuit through a corresponding one of the sub restriction elements.

An upper terminal of the storage element of each stage of each of the second to N-th storage circuits, except for the storage element being connected to the end sub-restriction element, is connected to an upper terminal of the storage element of a corresponding stage of a subsequent storage circuit through a corresponding one of the sub restriction elements.

The sub restriction elements are connected to one another through terminals thereof to define a series path of the sub restriction elements so that the sub restriction elements can be sequentially followed in a same polarity, the series path begins from the sub restriction element, one end of which is connected to the lower end of the first storage circuit, and ends by another one of the sub restriction elements. The end sub-restriction element is connected between an upper terminal of the another one of the sub restriction elements ending the series path and the first high-voltage terminal.

Through the series path, the upper terminals of all of the storage elements of the first to the N-th storage circuits are followed from the storage element on a lowest stage to the storage element on a highest stage in a predetermined order, such as the second storage circuit, . . . , the N-th storage circuit, the first storage circuit, . . . .

The sub restriction elements defining the series path are connected to have a predetermined connection polarity so that electric power is transmitted in a predetermined direction between the pair of low-voltage terminals and the pair of high-voltage terminals by transferring electric charge between the storage elements of the adjacent storage circuits.

All of the main restriction elements are provided by switches or rectification elements. In the case where all of the main restriction elements are provided by the switched, the sub restriction elements and the end sub-restriction element are provided by either rectification elements or switches. The control circuit periodically switches on and off of the main restriction elements, and performs a switching operation to generate transfer of the electric charge in the series path according to the connection polarity. In the switching operation, in a part of or an entirety of a period where one of the main restriction elements that is connected to the storage circuit to which one of the terminals of the sub restriction elements on a lower side in a connection of the sub restriction elements of the series path is connected is in an off state, the control circuit controls the corresponding sub restriction elements in an on state. In an entirety of a period where the one of the main restriction elements is in an on state, the control circuit controls the sub restriction elements in an off state.

In the case where all of the main restriction elements are provided by the rectification elements, all of the sub restriction elements and the end sub-restriction element are provided by switches. The control circuit periodically switches an on state and an off state of the sub restriction elements such that, among the sub restriction elements, the sub restriction elements connected to a same storage circuit are kept in a same on or off state.

According to the first aspect, the main restriction elements are interleaved. Therefore, current ripples of the magnetic parts can be cancelled. As such, the size of the magnetic parts can be reduced and loss of the magnetic parts can be reduced, as compared with the general boosting chopper mentioned above. Further, a voltage applied to the main restriction element is lowered, and switching loss is reduced, as compared with the general boosting chopper mentioned above.

According to the first aspect, the power converter is operated in a state where the second low-voltage terminal and the second high-voltage terminal are commonly connected. Therefore, when one of the second low-voltage terminal and the second high-voltage terminal, which serves as an input terminal, is grounded, the other of the second low-voltage terminal and the second high-voltage terminal is also grounded. As such, a potential of the output terminal of the power converter is fixed, and a current flowing through a stray capacitance is restricted. Hence, a conduction noise reduces. When a voltage between the first low-voltage terminal and the second low-voltage terminal, and a voltage between the first high-voltage terminal and the second high-voltage terminal are made zero such as by short-circuit, electric charges of the smoothing storage elements and other all of the storage elements of the storage circuits can be discharged, and the charges do not remain.

According to a second aspect of the present disclosure, in the power converter of the first aspect, in the case where the main restriction elements are provided by the switches, all of the sub restriction elements and the end sub-restriction element are provided by the rectification elements. The power converter is configured to boost or inversion-boost a voltage inputted from the pair of low-voltage terminals and to output the voltage from the pair of high-voltage terminals. The control circuit controls each of the main restriction elements such that each main restriction element is in the on state and then in the off state only for a predetermined charge transmission period, and at least one main restriction element is in the on state.

According to the second aspect, when the main restriction elements are controlled to the on state, the magnetic energy stored in the magnetic parts increases. When the main restriction elements are controlled to the off state, the magnetic energy transfers to storage elements of the storage circuits as an electrostatic energy. Due to repetitive control, the energy inputted from the low-voltage terminals is transmitted to the high-voltage terminals. In this case, if all of the main restriction elements are in the off state, a transfer path for transferring the magnetic energy to the storage elements of the storage circuits is not formed.

According to a third aspect of the present disclosure, in the power converter of the first aspect, in the case where all of the main restriction elements are provided by the switches, all of the sub restriction elements and the end sub-restriction element are provided by the switches. The power converter is configured to have one of a first operation state in which a voltage inputted from the pair of low-voltage terminals is boosted or inversion-boosted, and outputted from the pair of high-voltage terminals, and a second operation state in which a voltage inputted from the pair of high-voltage terminals is bucked and outputted from the pair of low-voltage terminals. The control circuit controls each of the main restriction elements such that each main restriction element is in the on state and then in the off state only for a predetermined charge transmission period, and at least one of the main restriction element is in the on state. Further, the control circuit controls the sub restriction elements connected between an M-th storage circuit and the storage circuit subsequent to the M-th storage circuit to one of the on state and the off state opposite to the state of the main restriction element connected to the M-th storage circuit, in which M is any one of 1 to N.

According to the third aspect, a synchronous rectification is performed in any of the main restriction elements and the sub restriction elements. Therefore, the conduction loss of the storage elements can be reduced, and an efficiency of the power converter can be further improved.

According to a fourth aspect of the present disclosure, in the power converter of the first aspect, all of the main restriction elements are provided by the rectification elements, and the all of the sub restriction elements and the end sub-restriction element are provided by the switch. The power converter is configured to buck a voltage inputted from the pair of high-voltage terminals and output the voltage from the pair of low-voltage terminals. The sub restriction elements and the end sub-restriction element are sorted into a first to an N-th sub-restriction element groups such that the sub restriction elements and the end sub-restriction element having the terminals connected to a same storage element are included in a same sub-restriction element group. The control circuit controls each of the sub-restriction element groups such that the each sub-restriction element group is in an off state and is then in an on state only for a predetermined charge transmission period, and at least one sub-restriction element group is in an off state.

According to the fourth aspect, when the sub restriction element group including the sub restriction elements disposed on a route from an M-th storage circuit to a subsequent storage circuit through the series path is in the on state, a charge current flows from the storage elements of the subsequent storage circuit to the storage elements of the M-th storage circuit through the sub restriction elements. The charge current is outputted from the low-voltage terminals through the magnetic parts of the M-th main current path. In this time, the main restriction element of the M-th main current path is in the off state. In a case where the end sub-restriction element is connected to the M-th storage circuit, the charge current flows from the high-voltage terminals to the M-th storage circuit through the end sub-restriction element.

When the sub restriction element group including the sub restriction element disposed on a route from the M-th storage circuit to a subsequent storage circuit is in the off state, a current flows back through the main restriction element and the magnetic part of the M-th main current path. With this, the voltage inputted from the high-voltage terminals is bucked and outputted from the low-voltage terminals.

According to a fifth aspect of the present disclosure, in the power converter according to any one of first to third aspects, a snubber circuit is provided. The snubber circuit includes a snubber first rectification element, a snubber storage element, and a snubber second rectification element. The snubber first rectification element and the snubber storage element are connected in series such that an intermediate node between the snubber first rectification element and the snubber storage element is interposed between the branch node of one of the main current paths and the branch node of another one of the main current paths. The snubber second rectification element is connected between an upper terminal of the storage element on a lowest stage of the second storage circuit and the intermediate node.

In a case where the first high-voltage terminal has a potential higher than a potential of the second high-voltage terminal, an anode of the snubber first rectification element is connected to one of the main current paths and an anode of the snubber second rectification element is connected to the intermediate node. In a case where the first high-voltage terminal has a potential lower than a potential of the second high-voltage terminal, a cathode of the snubber first rectification element is connected to one of the main current paths, and a cathode of the snubber second rectification element is connected to the intermediate node. In a case where the snubber circuit is connected to the main current path corresponding to the second storage circuit, a terminal of the snubber first rectification element opposite to a terminal connected to the intermediate node is connected to the main current path corresponding to the second storage circuit.

In a case of a boost circuit, when the main restriction element of the main current path to which the snubber first rectification element is connected is turned off, the current flowing in the magnetic path of the main current path flows into the snubber circuit and charges the snubber storage element. On the other hand, when the main restriction element of the main current path to which the snubber storage element of the snubber circuit is connected is turned off, electric charge stored in the snubber storage element is discharged and transferred to the storage circuit to which the snubber second rectification element is connected. Due to such operations, a rapid voltage change is reduced when the main restriction element to which the snubber circuit is connected is turned off. Also, a soft switching can be realized at zero voltage, and a surge voltage can be restricted. In this case, snubber energy stored in the snubber storage element can be regenerated to the output side.

According to a sixth aspect of the present disclosure, in the power converter according to any one of the first to fifth aspects, the magnetic part is an inductor. The inductor is widely used, and the power converter can be easily made.

According to a seventh aspect of the present disclosure, in the power converter according to any one of the first to sixth aspects, the magnetic parts of the main current paths share a magnetic core with each other. A total volume of the magnetic parts and dead space in arrangement of the magnetic parts can be reduced, as compared with a case where the independent magnetic parts are separately provided. As such, the power converter can be reduced in size.

According to an eighth aspect of the present disclosure, the power converter according to any one of the first to seventh aspects further includes a pair of intermediate terminals, a smoothing storage element, and an intermediate sub-restriction element. The pair of intermediate terminals include a first intermediate terminal and a second intermediate terminal. The first intermediate terminal is commonly connected to one of the first low-voltage terminal, the second low-voltage terminal, the first high-voltage terminal and the second low-voltage terminal. The smoothing storage element is connected between the pair of intermediate terminals. The intermediate sub-restriction element for leading out an intermediate output is connected to the upper terminal or the lower terminal of one of the storage elements of one of the storage circuits and the second intermediate terminal. The intermediate sub-restriction element is connected in a same polarity as that of the end sub-restriction element. In this structure, a plurality of systems of output voltage can be obtained from one power converter. As compared with a case where plural power converters are correspondingly provided for plural outputs, an entire size of the power converter can be reduced. Also, a plurality of systems of voltages can be inputted to one power converter.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which:

FIGS. 6A to 6F are diagrams illustrating current paths in the respective switching modes when the duty ratio is in the range from 33% to 66% according to the second embodiment;

FIGS. 13A to 13F are diagrams illustrating current paths in the respective switching modes according to the fifth embodiment;

DETAILED DESCRIPTION

The converter disclosed in the non-patent literature 1 can reduce the inductance and the switching loss, as compared with the general boosting chopper circuit. However it is difficult to put the converter of the non-patent literature 1 into practice in an ignition system for a vehicle due to the following points.

Firstly, one end of an in-vehicle storage battery is grounded. For this reason, the output terminals of the converter are not connected to a ground potential. However, the output terminals of a boosting power supply circuit of an ignition system including the engine need to be grounded, in view of reducing radiation noise.

Secondarily, in practical use, the boosting power supply circuit may be separated for the purpose of checking or exchanging the parts by failure, or the like. In such a case, a worker separates the boosting power supply circuit from the ignition plug after checking that the voltage between the input terminals and the voltage between the output terminals of the power supply are lowered. In the converter, however, even if the voltage between the input terminals and the voltage between the output terminals of the power supply are sufficiently lowered, there is a possibility that electric charge remains in the auxiliary capacitor and the voltage multiplier cell of the lowest stage.

Hereinafter, embodiments of the present disclosure will be described with reference to the drawings. Like parts are designated with like reference numbers, and descriptions thereof will not be repeated.

First Embodiment

Figure 1:
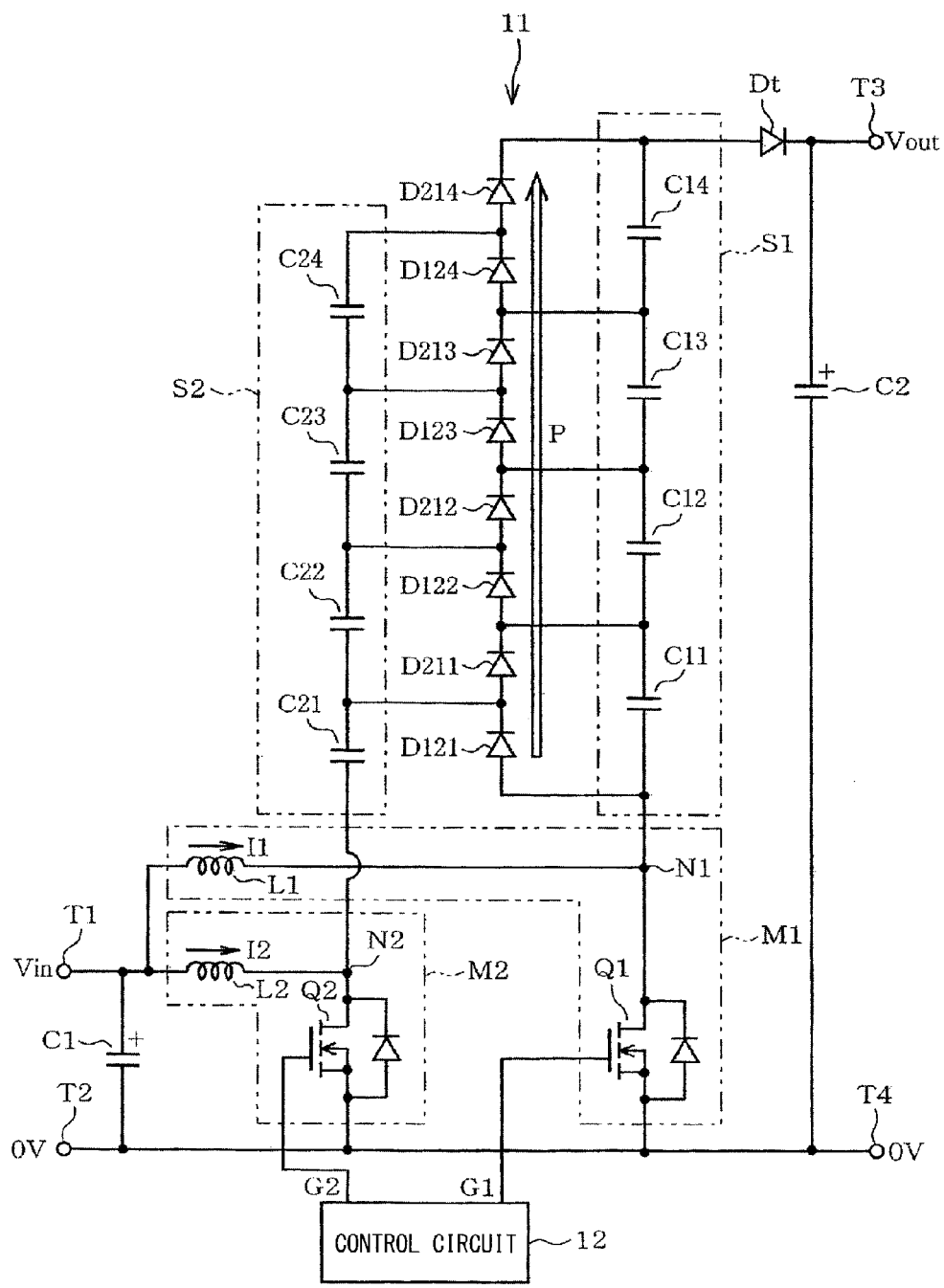
FIG. 1 is a diagram illustrating a schematic structure of a power converter according to a first embodiment of the present disclosure.

A first embodiment will be described with reference to FIGS. 1 to 3. A power converter 11 shown in FIG. 1 is a non-inverted boosting circuit that boosts an input voltage Vin of a storage battery inputted from a pair of low-voltage input terminals T1 and T2, and outputs a boosted voltage Vout from a pair of high-voltage output terminals T3 and T4.

The output terminal T4 is a common terminal commonly connected with the input terminal T2. The input terminal T2 and the output terminal T4 are used as being grounded. An ignition system of an internal combustion engine (not shown) further boosts the output voltage Vout to have a higher voltage value using a flyback transformer, and guides the boosted voltage to spark plug to discharge, thereby to ignite an injection fuel.

A capacitor C1 is connected between the input terminal T1 and the input terminal T2. A smoothing capacitor C2 is connected between the output terminal T3 and the output terminal T4.

Between the input terminal T1 and the input terminal T2, N systems of main current paths are connected in parallel. In the first embodiment, N is two. Therefore, two systems of the main current paths M1 and M2 are connected in parallel between the input terminal T1 and the input terminal T2.

In the main current path M1, an inductor L1 and a transistor Q1 are connected in series to each other through a branch node N1. In the main current path M2, an inductor L2 and a transistor Q2 are connected in series to each other through a branch node N2.

The inductors L1 and L2 are magnetic parts having an accumulating function of magnetic energy. The transistors Q1 and Q2 are, for example, N-channel type MOS transistors. The transistors Q1 and Q2 correspond to main restriction elements each restricting a conduction current. The transistors Q1 and Q2 serve as switches.

Storage circuits S1 and S2 are correspondingly provided for the main current paths M1 and M2. In the storage circuit S1, four capacitors C11, C12, C13, and C14 are stacked in four stages (levels), and connected in series. A lower end of the storage circuit S1 is connected to the branch node N1 of the main current path M1.

In the storage circuit S2, four capacitors C21, C22, C23, and C24 are stacked in four stages (level), and connected in series. A lower end of the storage circuit S2 is connected to the branch node N2 of the main current path M2.

The capacitors C11 to C24 correspond to storage elements. A terminal of each capacitors C11 to C24 adjacent to the main current paths M1 and M2, that is, a terminal of each capacitors C11 to C24 on a low-potential side will be referred to as a lower terminal. A terminal of each capacitors C11 to C24 further from the main current paths M1 and M2, that is, a terminal of each capacitors C11 to C24 on a high-potential side will be referred to as an upper terminal.

The two systems of the main current paths M1 and M2 and the storage circuits S1 and S2 connected to the two systems of the main current paths M1 and M2 are assigned with sequential order of first and second. The main current path M1 and the storage circuit S1 are assigned with the first in the sequential order, and the main current path M2 and the storage circuit S2 are assigned with the second in the sequential order. In the sequential order, the second follows the first, and then the sequential order returns to the first. This sequential order relates to a connecting structure of diodes, which will be described later.

In between the storage circuits S1 and S2, diodes are connected. In particular, diodes D121, D122, D123, D124, D211, D212, D213 and D214 are connected between the terminals of the capacitors C11 to C14 and the terminals of the capacitors C21 to C24.

The lower terminal of each of the capacitors C11, C12, C13 and C14 on the respective stages of the first storage circuit S1 is connected to the upper terminal of corresponding one of capacitors C21, C22, C23 and C24 on the same stage, which forms the second storage circuit S2, through corresponding one of diodes D121, D122, D123 and D124.

The upper terminal of each of the capacitors C21, C22, C23 and C24, except for a capacitor connected to an end diode Dt, on the respective stages of the second storage circuit S2 is connected to the upper terminal of corresponding one of the capacitors C11, C12, C13 and C14 on the same stage, which forms the first storage circuit S1, through corresponding one of diodes D211, D212, D213 and D214. It is to be noted that, in the present embodiment, the second storage circuit S2 does not have the capacitor that is connected to the end diode Dt.

As a result of such a connection, all of the diodes D121 to D214, except for the end diode Dt, can be followed in the same polarity, that is, in the polarity of a forward direction from an anode to a cathode, in series beginning from the diode D121 and ending at the D214 in an order of D121, D211, D211, D122, ... D214. The lower terminal of the diode D121, which corresponding to the beginning diode, is connected to the lower end of the first storage circuit S1. The terminals of the diodes D121 to D214 are connected to one another. Thus, a series path P of the diodes D121 to D214 is formed.

When the series path P is followed, the upper terminals of all of the capacitors C11 to C14 and C21 to C24 of the storage circuits S1 and S2 are followed in a predetermined order from the capacitors C21, C11 on the lowest stage to the capacitors C24, C14 on the highest stage. That is, the upper terminals of all of the capacitors C11 to C14 and C21 to C24 are followed in an order of the second storage circuit, the first storage circuit, the second storage circuit, ..., that is, in the order of C21, C11, C22, ..., C24, to C14.

The end diode Dt is connected between the upper terminal of the storage circuit S1 to which the series circuit P ultimately reaches after passing through the series circuit P and the output terminal T3.

The diodes D121 to D214 and the end diode Dt, which are rectification elements, correspond to sub-restriction elements.

The connection polarity of the diodes D121 to D214 of the series path P and the connection polarity of the end diode Dt are determined such that electric power is transmitted in a direction from the input terminals T1 and T2 to the output terminals T3 and T4 by transferring electric charge mutually between the capacitors of the storage circuit S1 and the capacitors of the adjacent storage circuit S2.

Specifically, the terminals of the diodes D121, D122, D123 and D124 adjacent to the first storage circuit S1 are anodes, and the terminals of the diodes D211, D212, D213 and D214 adjacent to the storage circuit S2 are anodes. Also, the terminal of the end diode Dt adjacent to the storage circuit S1 is an anode.

Next, an operation of the present embodiment will be described with reference to FIGS. 2 and 3.

Figure 2:
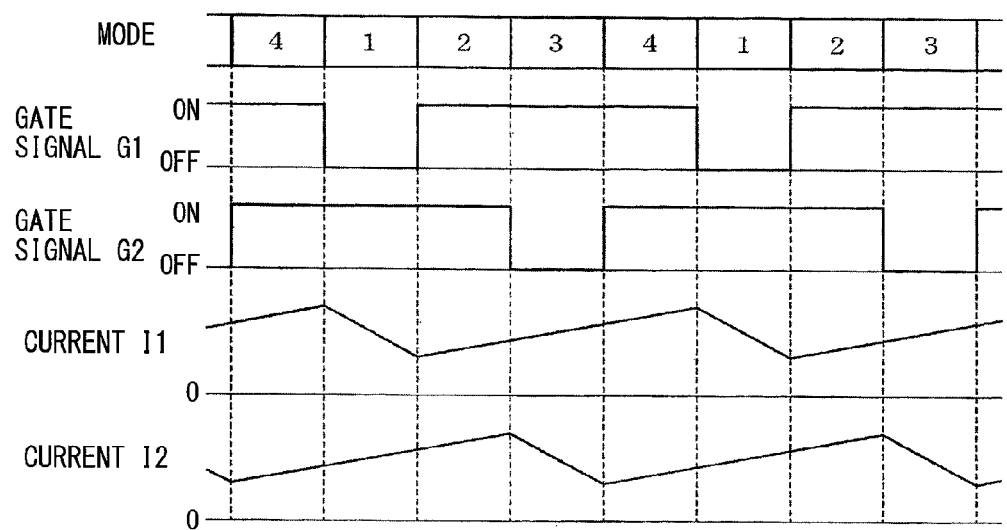
FIG. 2 is a waveform chart illustrating waveforms corresponding to respective switching modes according to the first embodiment.
Figure 3A:
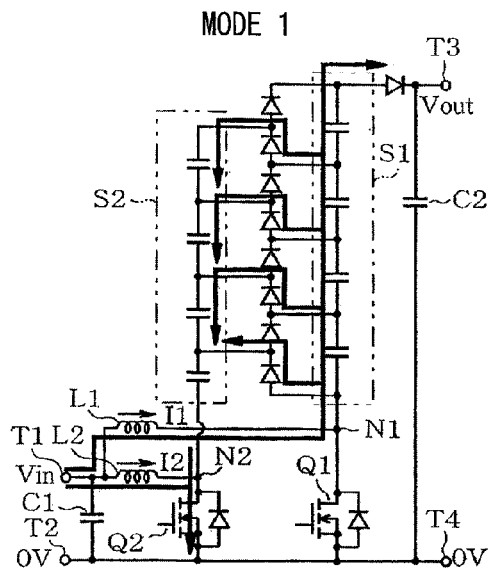
FIGS. 3A to 3D are diagrams illustrating current paths in the respective switching modes according to the first embodiment.
Figure 3B:
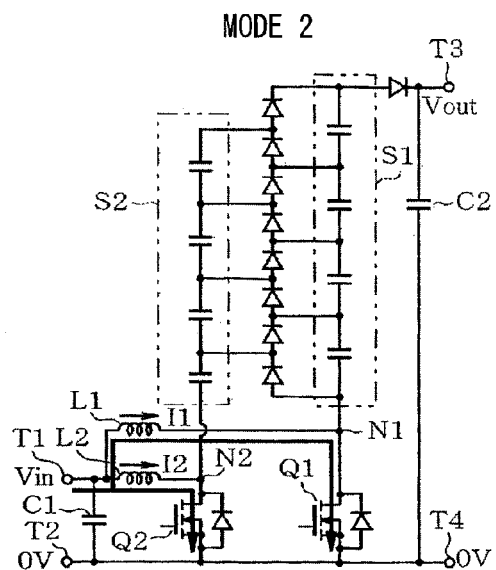
Figure 3C:
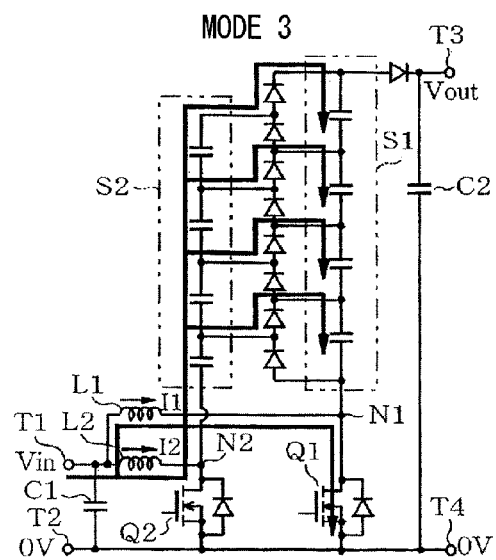
Figure 3D:
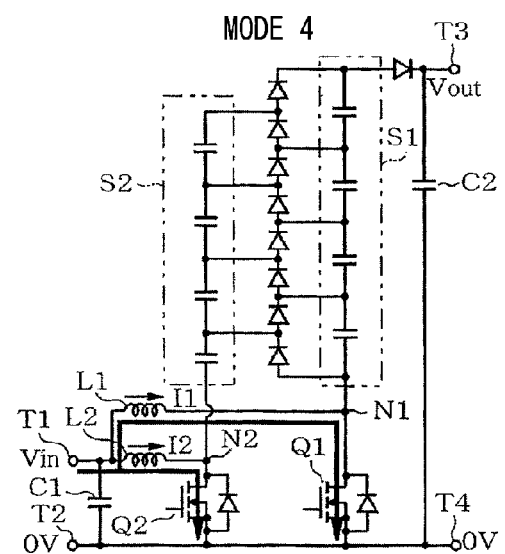

FIG. 2 is a waveform chart illustrating switching modes relating to switching states, waveforms of gate signals G1 and G2 of the transistors Q1 and Q2, and waveforms of currents I1 and I2 flowing in inductors L1 and L2.

A control circuit 12 periodically switches an on state (conduction state) and an off state (non-conduction state) of each of the transistors Q1 and Q2.

The control circuit 12 controls each of the transistors Q1 and Q2 to the off state only for a predetermined electric charge transmission period in a state of controlling the transistor in the on state. In this case, the control circuit 12 controls the transistors Q1 and Q2 such that at least one of the transistors Q1 and Q2 is in the on state.

In the present embodiment, the control circuit 12 controls the transistors Q1 and Q2 such that the transistors Q1 and Q2 are interleaved according to the gate signals G1 and G2 having the same wave form with a phase difference of 180°. As a result, a duty ratio taken by the gate signals G1 and G2 is higher than 50% and lower than 100%.

The control circuit 12 detects the output voltage Vout by a detection circuit (not shown), and inputs a voltage difference between the voltage detected and a target voltage, for example, into a PI controller, thereby to control the duty ratio of the gate signals G1 and G2. When the detected voltage becomes lower than the target voltage, the duty ratio increases. When the detected voltage becomes higher than the target voltage, the duty ratio reduces. For a light load, when the output voltage Vout exceeds the target voltage even when the duty ratio reduces to 50%, the control circuit 12 switches the operation from a continuous operation to an intermittent operation.

FIGS. 3A to 3D are diagrams illustrating current paths in respective modes 1 to 4. In the mode 4, the transistors Q1 and Q2 are turned on, and the potentials of the branch nodes N1 and N2 are substantially 0 V. Therefore, the currents I1 and I2 of the inductors L1 and L2 increase.

In the mode 1, the transistor Q1 is turned off, and the potential of the storage circuit S1 is boosted up. Thus, the current I1 flowing in the inductor L1 flows into the storage circuit S1 from the branch node N1. As a result, the diodes D121, D122, D123 and D124 are turned on, and the electric charge transfers into the capacitors C21, C22, C23 and C24, which form the storage circuit S2, to charge the storage circuit S2. In this case, the capacitor C2 is also charged through the end diode Dt.

In the mode 2, the transistors Q1 and Q2 are turned on, similarly to the mode 4. Thus, the currents I1 and I2 of the inductors L1 and L2 increase.

In the mode 3, the transistor Q2 is turned off, and the potential of the storage circuit S2 is boosted up. Thus, the current flowing in the inductor L2 flows into the storage circuit S2 from the branch node N2. As a result, the diodes D211, D212, D213 and D214 are turned on, and the electric charge is transferred into the capacitors C11, C12, C13 and C14, which form the storage circuit S1, to charge the storage circuit S1. In this case, the diode Dt is not turned on.

According to the operations described above, when the forward voltage of the diode is approximate to zero, in the mode 1, the voltage of the capacitor C11 and the voltage of the capacitor C22 are equal to each other, and the voltage of the capacitor C12 and the voltage of the capacitor C23 are equal to each other. Likewise, the voltage of the capacitor C13 and the voltage of the capacitor C24 are equal to each other. In the mode 3, the voltage of the capacitor C12 and the voltage of the capacitor C22 are equal to each other, and the voltage of the capacitor C13 and the voltage of the capacitor C23 are equal to each other. Likewise, the voltage of the capacitor C14 and the voltage of the capacitor C24 are equal to each other. Namely, the voltages of the capacitors C11 to C24, except for the capacitor C21, are all equal to each other. Based on the on state of the diodes in the mode 1, the output voltage Vout is equal to the sum of the voltages of the capacitors C21, C11, C12, C13 and C14.

In the mode 1, a drain voltage of the transistor Q1 is equal to the voltage V(C21) of the capacitor C21. In the mode 3, a drain voltage of the transistor Q2 is equal to a voltage V(C11)-V(C21) that is obtained by subtracting the voltage V(C21) of the capacitor C21 from the voltage V(C11) of the capacitor C11.

In the present embodiment, the duty ratio of the transistor Q1 and the duty ratio of the transistor Q2 are the same value D. Considering that a time average of the voltage applied to the inductors L1 and L2 needs to be zero, the following expressions (1) and (2) are established. The value D of the duty ratio is in a range from 0 to 1, which is true for expressions described later.

$$D \cdot V\text{in} + (1-D)(V\text{in} - V(C21)) = 0 \quad (1)$$

$$D \cdot V\text{in} + (1-D)(V\text{in} - (V(C11) - V(C21))) = 0 \quad (2)$$

According to the expressions (1) and (2), the voltage V(C21) and the voltage V(C11)-V(C21) need to be the same voltage as a voltage VA given by the following expression (3). Namely, both of the drain voltage of the transistor Q1 in the mode 1 and the drain voltage of the transistor Q2 in the mode 3 are the voltage VA.

$$VA = 1/(1-D) \times V\text{in} \quad (3)$$

As such, the voltages of the capacitors C11 to C24, except for the capacitor C21, are voltage 2VA, and the voltage of the capacitor C21 is the voltage VA. In the mode 1, the output current flows through the end diode Dt. Therefore, when the number of stages of the capacitors of the storage circuits S1 and S2 is defined as Ns, the output voltage Vout is given as in the following expression (4). In the present embodiment, the number of stages Ns is four.

$$V\text{out}(2Ns+1)VA = (2Ns+1)/(1-D) \times V\text{in} \quad (4)$$

When the ignition system has a failure, the power converter 11 may be separated for the purpose of checking or exchanging parts. In such a case, a worker separates the storage battery from the input terminals T1 and T2 to make the power converter 11 in a state where the voltage between the input terminals T1 and T2 and the voltage between the output terminals T3 and T4 are sufficiently lowered. The simplest way is to short-circuit between the input terminals T1 and T2 and between the output terminals T3 and T4 immediately after the storage battery is separated.

In this case, the electric charges of the capacitors C1 and C2 are zero. Further, the electric charges of all of the capacitors C11 to C24 of the storage circuits S1 and S2 are discharged through the diodes D121 to D214 and the end diode Dt. Therefore, no voltage remains in any of the nodes of the power converter 11. The worker can separate the connection with the spark plug in this state.

According to the power converter 11 of the present embodiment described above, the transistors Q1 and Q2 are interleaved. Therefore, ripples of the currents flowing in the inductors L1 and L2 are cancelled. As such, the inductors L1 and L2 can be made small, and the loss can be reduced. The voltages applied to the transistor Q1 and Q2 are low as the voltage VA, and the switching loss of the transistors Q1 and Q2 reduces. Since the power converter 11 has a two-phase structure, it can be configured with a smaller number of transistors, as compared with another embodiment described later.

In the power converter 11, the input terminal T2 and the output terminal T4 are commonly connected. Therefore, the input terminal T4 can be grounded by grounding the input terminal T2. As such, the potentials of the output terminals T3 and T4 are fixed, and a current flowing through a stray capacitance is reduced. Therefore, a conduction noise, such as a common mode noise, reduces.

The state where the voltage between the input terminals T1 and T2 and the voltage of the output terminals T3 and T4 are lowered after the storage battery is separated from the power converter 11 ensures that the electric charges of all of the capacitors C1, C2, C11 to C24 of the power converter 11 are discharged. Therefore, it is easy to check the residual charge in the power converter 11.

Second Embodiment

Figure 4:
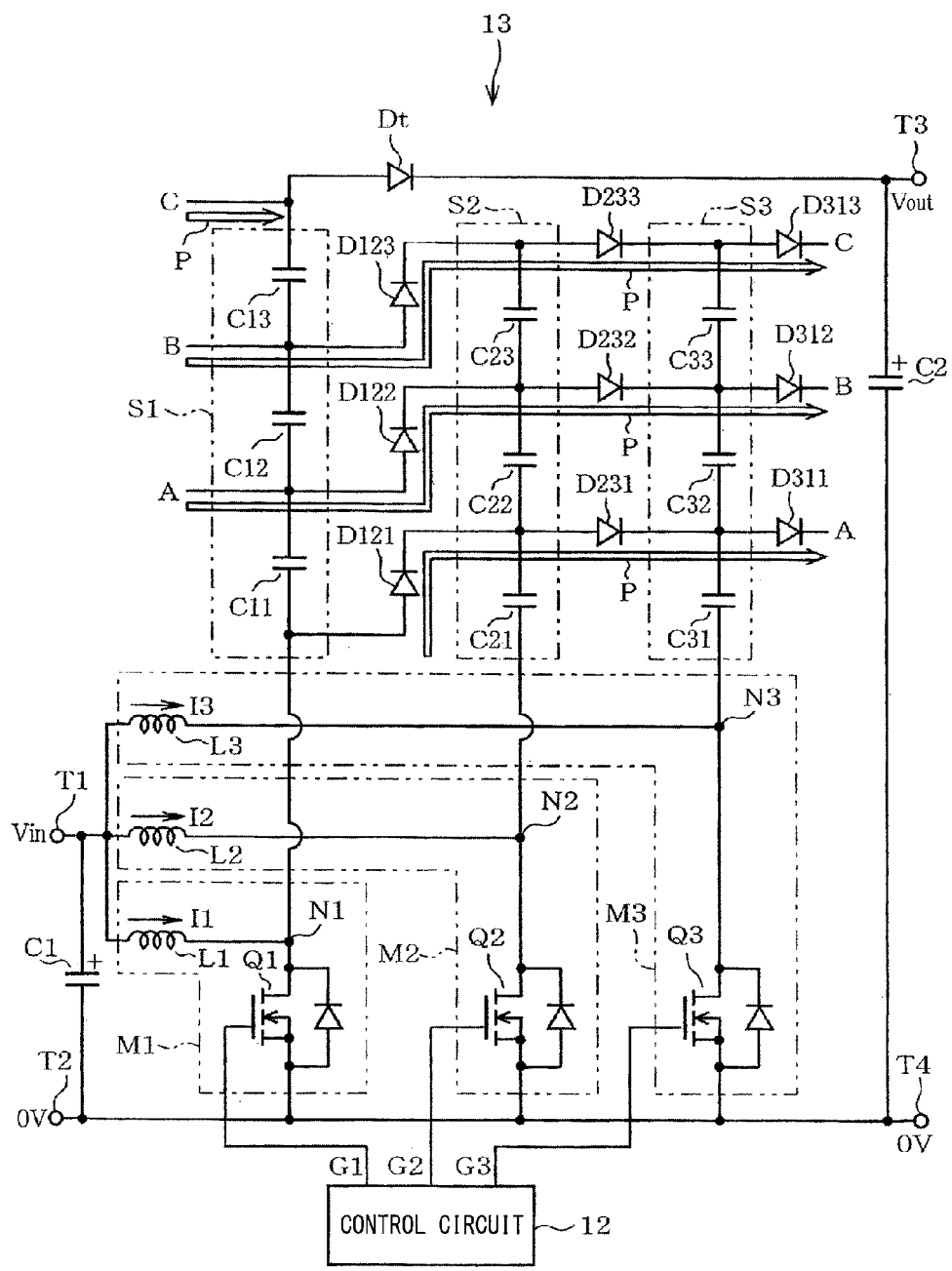
FIG. 4 is a diagram illustrating a schematic structure of a power converter according to a second embodiment of the present disclosure.

A second embodiment will be described with reference to FIGS. 4 to 8. As shown in FIG. 4, a power converter 13 has a three-phase structure, though the power converter 1 shown in FIG. 1 has a two-phase structure. In FIG. 4, one point A connects to the other point A. Likewise, one point B connects to the other point B, and one point C connects to the other point C.

Between the input terminals T1 and T2, N systems of main current paths M1, M2 and M3 are connected in parallel. In the present embodiment, N is three, and thus three systems of the main paths M1, M2 and M3 are connected in parallel between the input terminals T1 and T2. Similarly to the main current paths M1 and M2, the main current path M3 has an inductor L3 and a transistor Q3, which are connected in series through a branch node N3.

Storage circuits S1, S2 and S3 are correspondingly provided for the main current paths M1, M2 and M3. In the storage circuit S1, capacitors C11, C12 and C13 are stacked in three stages (levels), and are connected in series. In the storage circuit S2, capacitors C21, C22 and C23 are stacked in three stages (levels), and are connected in series. In the storage circuit S3, capacitors C31, C32 and C33 are stacked in three stages (levels), and are connected in series. The lower end of the storage circuit S3 is connected to the branch node N3 of the main current path M3.

The three systems of the main current paths M1, M2 and M3 and the storage circuits S1, S2 and S3 correspondingly connected to the main current paths M1, M2 and M3 are assigned with a sequential order of the first, the second and the third, respectively.

The lower terminal of each of the capacitors C11, C12 and C13 on the respective stages of the first storage circuit S1 is connected to the upper terminal of corresponding one of the capacitors C21, C22 and C23 on the same stage, which forms the second storage circuit S2 on the next sequential order, through a corresponding one of the diodes D121, D122 and D123.

The lower terminal of each of the capacitors C21, C22 and C23, except for the capacitor connected to the end diode Dt, of the respective stages of the second storage circuit S2 is connected to the upper terminal of corresponding one of the capacitors C31, C32 and C33 on the same stage, which forms the third storage circuit S3 on the next sequential order, through a corresponding one of diodes D231, D232 and D233. In the present embodiment, the second storage circuit S2 does not have the capacitor connected to the end diode Dt.

The upper terminal of each of the capacitors C31, C32 and C33, except for the capacitor connected to the end diode Dt, of the respective stages of the third storage circuit S3 is connected to the upper terminal of the corresponding one of the capacitors C11, C12 and C13 on the same stage, which forms the first storage circuit S1 on the next sequential order, through a corresponding one of diodes D311, D312 and D313. In the present embodiment, the third storage circuit S3 does not have the capacitor connected to the end diode Dt.

As a result of such a connection, all of the diodes D121 to D214, except for the end diode Dt, can be followed in the same polarity, that is, in the polarity of a forward direction from an anode to a cathode, in series beginning from the diode D121 and ending at the D313 in an order of D121, D231, D311, D122, ..., D233, D313. The lower terminal of the diode D121, which corresponding to the beginning diode, is connected to the lower end of the first storage circuit S1. The terminals of the diodes D121 to D313 are connected to one another. Thus, a series path P of the diodes D121 to D313 is formed.

When the series path P is followed, the upper terminals of all of the capacitors C11 to C13, C21 to C23 and C31 to C33 of the storage circuits S1, S2 and S3 are followed in a predetermined order from the capacitors C21, C31 and C11 on the lowest stage to the capacitors C23, C33 and C13 on the highest stage. That is, the upper terminals of all of the capacitors C11 to C13, C21 to C23 and C31 to C33 are followed in an order of the second storage circuit S2, the third storage circuit S3, the first storage circuit S1, ..., that is, in the order of C21, C31, C11, C22, ..., C33, C13.

The end diode Dt is connected between the upper terminal of the storage circuit S1 to which the series circuit P ultimately reaches after passing through the series circuit P and the output terminal T3.

The diodes D121 to D313 and the end diode Dt have polarities in the similar manner as described in the first embodiment. Specifically, the diodes D121, D122 and D123 have the anode on the side adjacent to the first storage circuit S1. The diodes D231, D232 and D233 have the anode on the side adjacent to the second storage circuit S2. The diodes D311, D312 and D313 have the anode on the side adjacent to the third storage circuit S3. The end diode Dt has the anode on the side adjacent to the first storage circuit S1.

Next, an operation of the present embodiment will be described with reference to FIGS. 5 to 8.

The control circuit 12 controls each of the transistors Q1, Q2 and Q3 such that each transistor is controlled to the conduction state, and is then controlled to the non-conduction state only for a predetermined charge transmission period. In this case, the control circuit 2 controls the transistors Q1, Q2 and Q3 such that at least one transistor is in the on state. A continuous operation cannot be maintained by a duty ratio that creates a state where all of the transistors Q1, Q2 and Q3 are in the off state.

In the present embodiment, the transistors Q1, Q2 and Q3 are interleaved according to the gate signals G1, G2 and G3 having the same wave form with a phase difference of 120°. As a result, the duty ratio taken by the gate signals G1, G2 and G3 is higher than "100/phase number" % and is lower than 100%. Hereinafter, an operation of the case where the duty ratio is from 33% to 66% and an operation of the case where the duty ratio is from 66% to 100% will be separately described.

(1) Duty Ratio 33% to 66%

Figure 5:
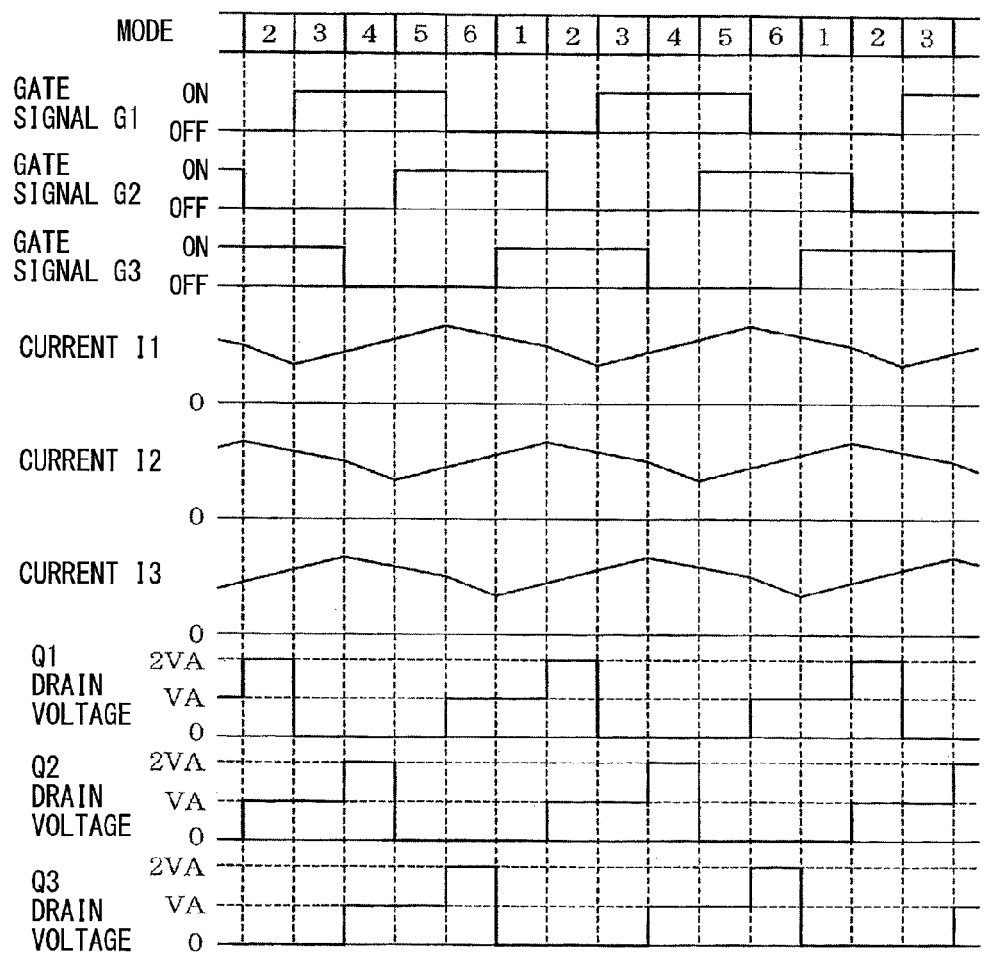
FIG. 5 is a waveform chart illustrating waveforms corresponding to respective switching modes when a duty ratio is in a range from 33% to 66% according to the second embodiment.

FIG. 5 is a waveforms chart illustrating modes when the duty ratio is 50% and waveforms of the gate signals G1, G2 and G3, the currents I1, I2 and I3 flowing in the inductors L1, L2 and L3 and the drain voltages of the transistors Q1, Q2 and Q3. FIGS. 6A to 6F are diagrams illustrating current paths in the respective modes 1 to 6.

In the mode 5, the transistors Q1 and Q2 are turned on, the currents I1 and I2 of the inductors L1 and L2 increase. When the operation changes to the mode 6 from the mode 5, the transistor Q1 is turned off, and the potential of the first storage circuit S1 is boosted up Thus, the current I1 flowing in the inductor L1 flows into the first storage circuit S1 from the branch node N1. Since the transistor Q2 is in the on state, the diodes D121, D122 and D123 are turned on. Thus, the electric charges are transferred to the capacitors C21, C22 and C23 of the second storage circuit S2, and the capacitors C21, C22 and C23 are charged. Even when the operation changes from the mode 6 to the mode 1, the current I1 flows in the same path.

When the operation changes from the mode 1 to the mode 2, the transistor Q2 is turned off. Therefore, the transfer of the electric charges to the capacitors C21, C22 and C23 stops. However, the transistor Q3 is in the on state. Therefore, the diodes D231, D232 and D233 are turned on, in addition to the diodes D121, D122 and D123. Therefore, the electric charges are transferred to the capacitors C31, C32 and C33 of the third storage circuit S3, and the capacitors C31, C32 and C33 are charged. In this case, the capacitor C2 is also charged through the end diode Dt. In the modes 3 to 5, the transistor Q1 is in the on state, and the current I1 of the inductor L1 increases. This is true for the currents I2 and I3.

By this operation, the capacitor C21 has the voltage VA, and the capacitor C31 has the voltage 2VA. The other capacitors have voltage 3VA. In the mode 6 and the mode 1, the drain voltage of the transistor Q1 is VA (=V(C21)). In the mode 2, the drain voltage of the transistor Q1 is 2VA (=V(C31)). In the modes 3 to 5, the drain voltage of the transistor Q1 is zero. In the mode 6 and the mode 1, the voltage applied to the inductor L1 is Vin−VA. In the mode 2, the voltage applied to the inductor L1 is Vin−2VA. In the modes 3 to 5, the voltage applied to the inductor L1 is Vin.

Since a time average of the voltage applied to each inductor needs to be zero, the following expression (5) is established. The width from the mode 3 to the mode 5 is D, the width from the mode 6 to the mode 1 is 1/3, and the width of the mode 2 is 2/3−D.

$$D \cdot Vin(1/3) \cdot (Vin - VA) + (2/3 - D) \cdot (Vin - 2VA) = 0 \quad (5)$$

According to the expression (5), the voltage VA has the value expressed by the expression (6).

$$VA = 1/(5/3 - 2D) \times Vin \quad (6)$$

In the mode 2, the output current flows through the end diode Dt. Therefore, when the number of stages of the capacitors of the first to third storage circuits S1, S2 and S3 is defined as Ns, the output voltage Vout is given by the following expression (7). In the present embodiment, the number of stages Ns is three.

$$Vout = (3Ns+2)VA = (3Ns+2)/(5/3-2D) \times Vin \quad (7)$$

(2) Duty Ratio 66% to 100%

Figure 7:
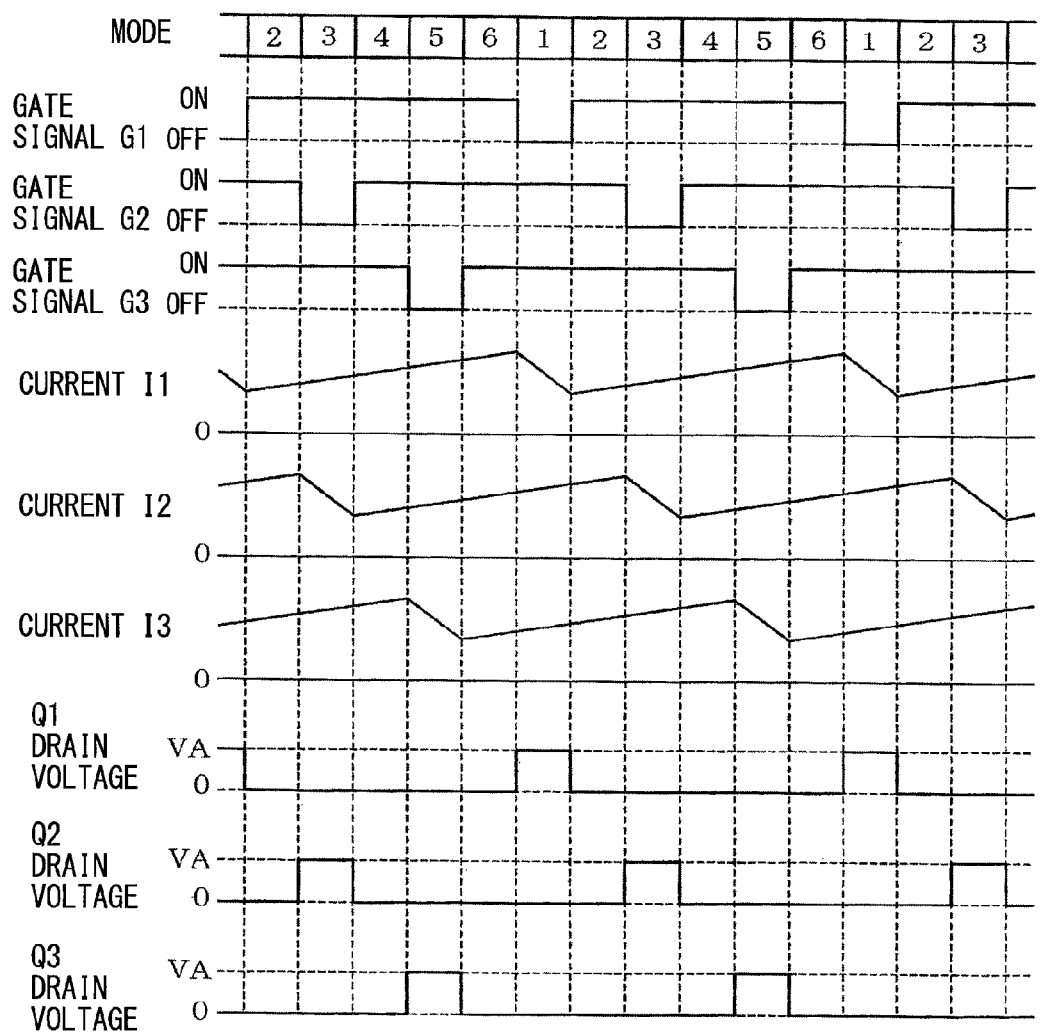
FIG. 7 is a waveform chart illustrating waveforms corresponding to respective switching modes when a duty ratio is in a range from 66% to 100% according to the second embodiment.

FIG. 7 is a waveforms chart a waveform chart illustrating modes when the duty ratio is 83% and waveforms of the gate signals G1, G2 and G3, the currents I1, I2 and I3 flowing in the inductors L1, L2 and L3 and the drain voltages of the transistors Q1, Q2 and Q3.

Figure 8A:
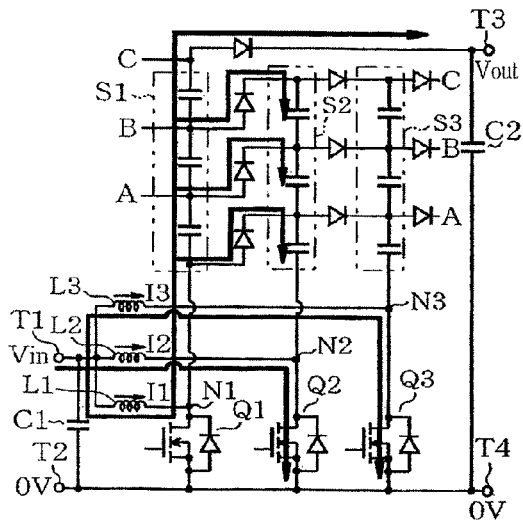
FIGS. 8A to 8D are diagrams illustrating current paths in the respective switching modes when the duty ratio is in the range from 66% to 100% according to the second embodiment.
Figure 8B:
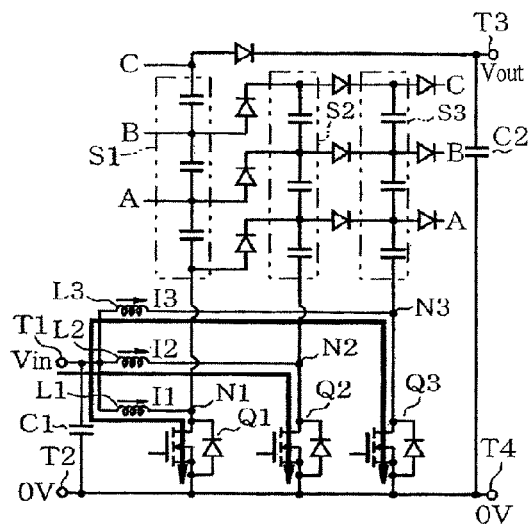
Figure 8C:
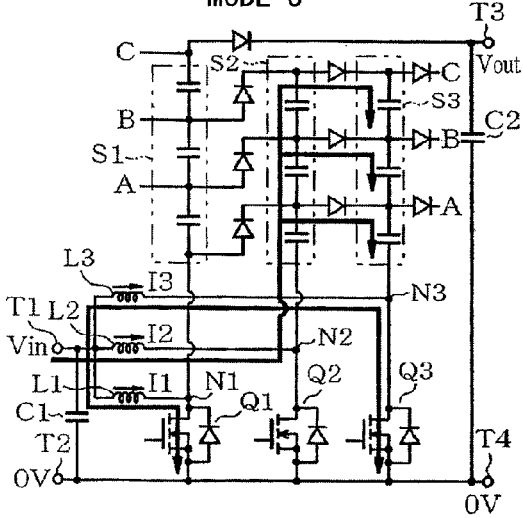
Figure 8D:
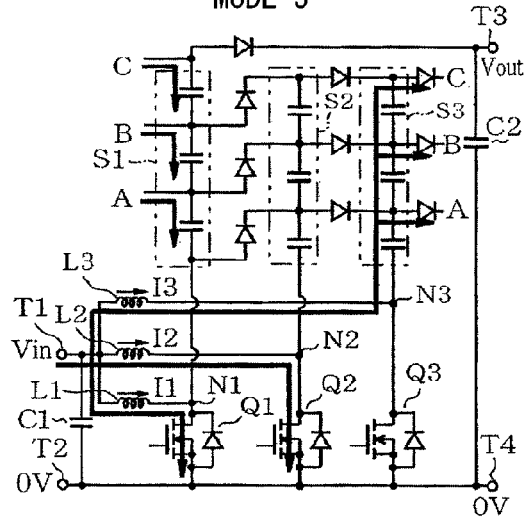

FIG. 8A is a diagram illustrating the current path in the mode 1. FIG. 8B is a diagram illustrating the current path in the modes 2, 4 and 6. FIG. 8C is a diagram illustrating the current path in the mode 3. FIG. 8D is a diagram illustrating the current path in the mode 5.

In this case, the operation of the power converter 13 is similar to the operation of the power converter 11 with the two-phase structure, except that the power converter 13 has the three-phase structure. The end diode Dt is turned on in the mode 1.

The voltage of the capacitor C21 is VA. The voltage of the capacitor C31 is 2VA. The voltage of the other capacitors is 3VA. The drain voltage of the transistor Q1 in the mode 1, the drain voltage of the transistor Q2 in the mode 3, the drain voltage of the transistor Q3 in the mode 5 are VA.

The output voltage Vout relative to the duty ratio D can be obtained based on the following expression (8) that indicates the time average of the voltage applied to each inductor being zero.

$$D \cdot Vin + (1-D) \cdot (Vin - VA) = 0 \quad (8)$$

According to the expression (8), the voltage VA has the value given by the following expression (9), similar to the expression (3).

$$VA = 1/(1-D) \times Vin \quad (9)$$

In the mode 1, the output current flows through the end diode Dt. Therefore, the output voltage Vout is given by the following expression (10).

$$Vout = (3Ns+1)VA = (3Ns+1)/(1-D) \times Vin \quad (10)$$

Also in the present embodiment described hereinabove, the effects similar to those of the first embodiment can be achieved. In addition, the number of phases is increased to three. Therefore, the boost ratio can be further increased. Further, the duty ratio of the transistors Q1, Q2 and Q3 can be widely varied from 33% to 100%. Therefore, the control circuit 2 can perform the voltage feedback control stably and accurately, even if the load is largely changed.

Third Embodiment

Figure 9:
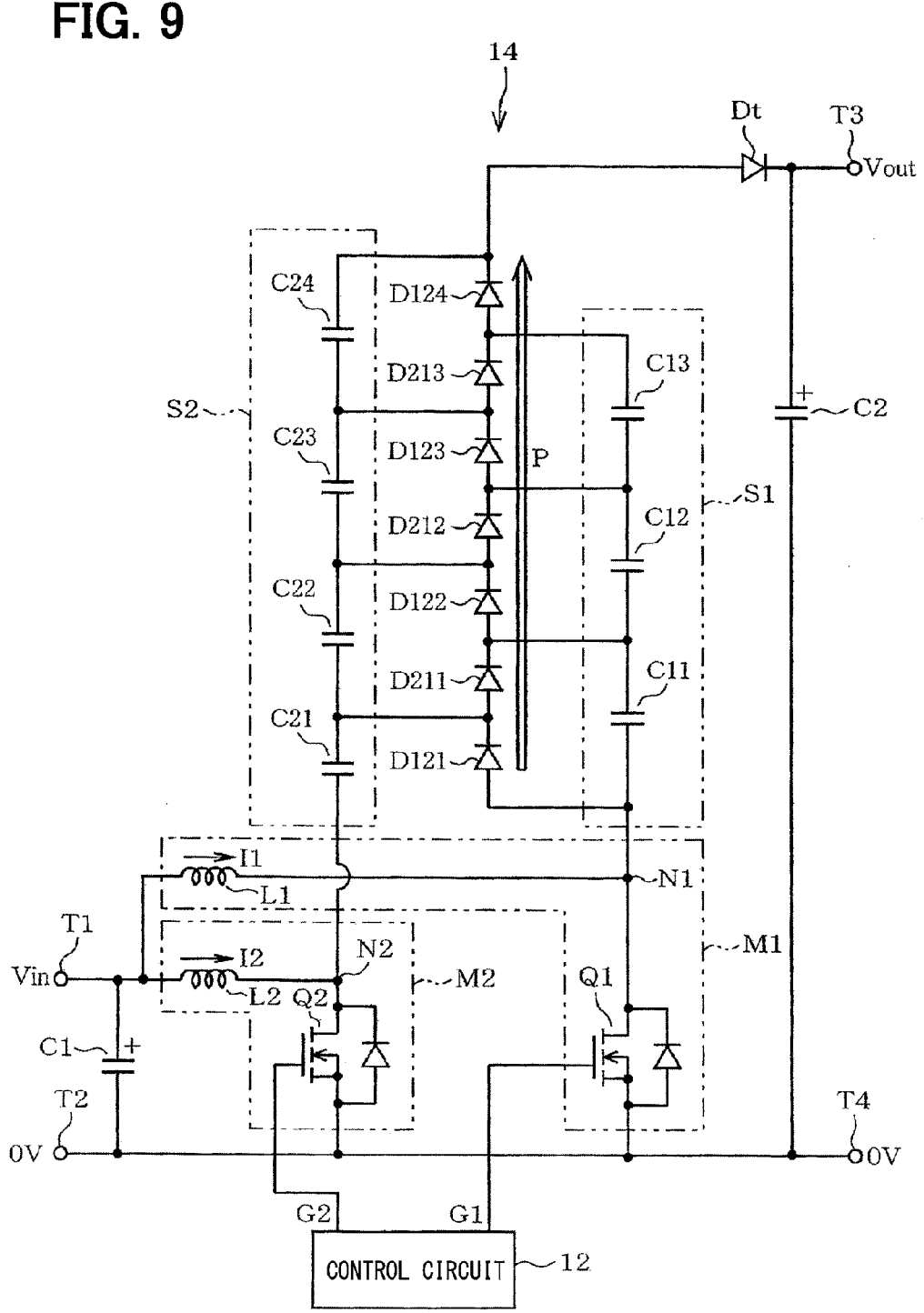
FIG. 9 is a diagram illustrating a schematic structure of a power converter according to a third embodiment of the present disclosure.

A third embodiment will be described with reference to FIG. 9.

In a power converter 14, the node to lead the output to the end diode Dt is different from that of the power converter 11 shown in FIG. 1. That is, in the power converter 11, the number of stages of the first storage circuit S1 and the number of stages of the second storage circuit S2 are equal to each other, and the output is led out from the upper end of the first storage circuit S1. In the power converter 14, on the other hand, the number of stages of the second storage circuit S2 is greater than the number of stages of the first storage circuit S1 by one, and the output is led out from the upper end of the second storage circuit S2.

Except for the capacitor C24 connected to the end diode Dt, the upper terminal of each of the capacitors C21, C22 and C23 of the respective stages of the second storage circuit S2 is connected to the upper terminal of the corresponding one of the capacitors C11, C12 and C13 on the same stage, which forms the first storage circuit S1, through the corresponding one of the diodes D211, D212 and D213. The control circuit 12 performs the switching operation in the similar manner as that of the first embodiment shown in FIG. 2.

The voltage of the capacitors C11 to C24 (except for the capacitor C21) is 2VA, and the voltage of the capacitor C21 is VA. In the mode 3 shown in FIG. 2, the end diode Dt is turned on, and the capacitor C2 is charged. In this case, the output voltage Vout is 8VA by adding the voltages V(C11), V(C22), V(C23) and V(C24). Also in the present embodiment, the boosting operation similar to that of the first embodiment can be achieved. Also, the effects similar to those of the first embodiment can be achieved.

In the power converter 14 of the present embodiment, the number of the capacitors is smaller than that of the capacitors of the first embodiment by one. Instead, the output voltage Vout slightly reduces from 9VA to 8VA.

Fourth Embodiment

A fourth embodiment will be described with reference to FIGS. 10 and 11.

Figure 10:
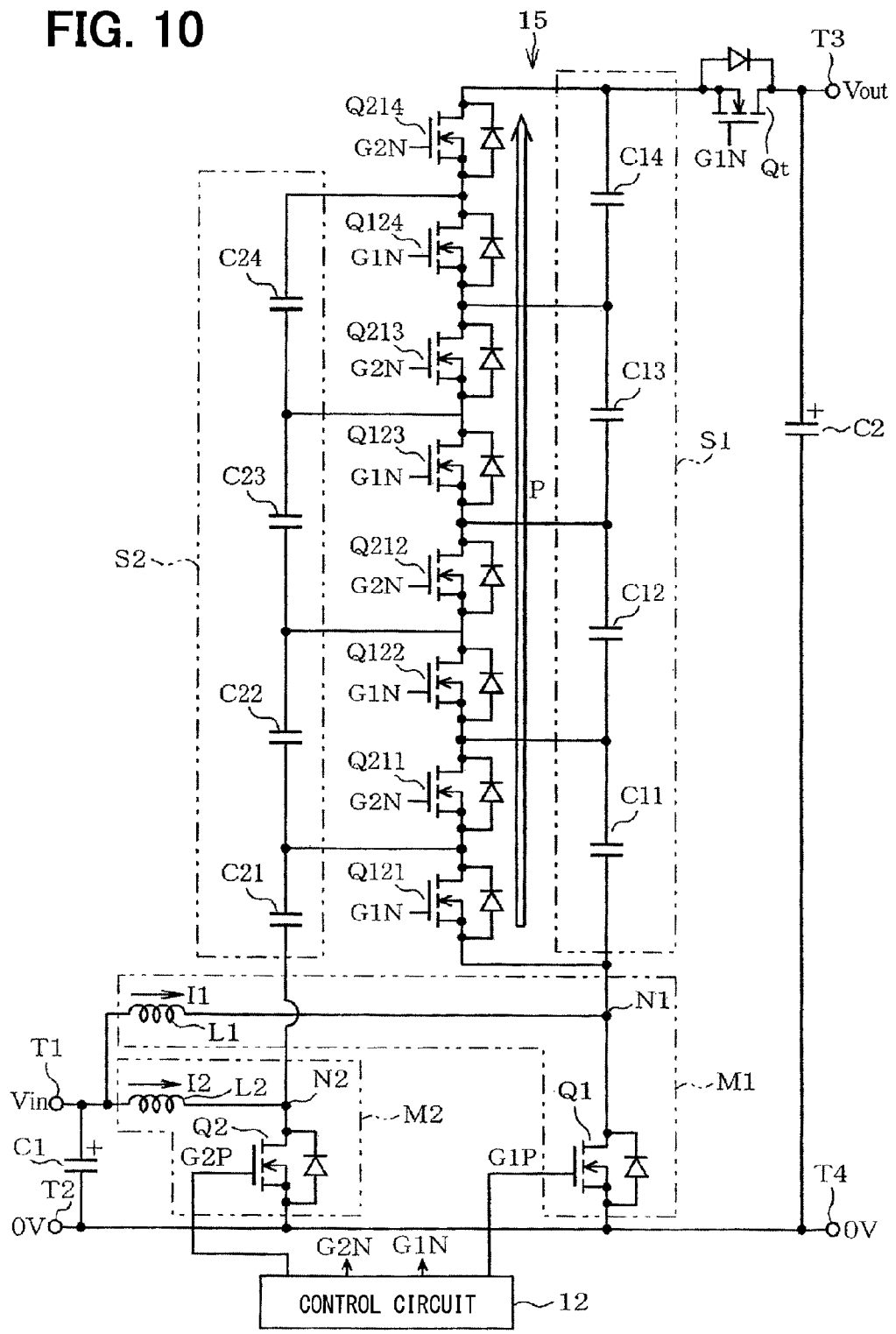
FIG. 10 is a diagram illustrating a schematic structure of a power converter according to a fourth embodiment of the present disclosure.

A power converter 15 shown in FIG. 10 is provided by replacing the diodes D121 to D214 and the end diode Dt of the power converter 11 shown in FIG. 1 with transistors Q121 to Q214 and an end transistor Qt, respectively. The transistors S121 to Q214 correspond to sub-restriction elements. The end transistor Qt corresponds to an end sub-restriction element.

Figure 11:
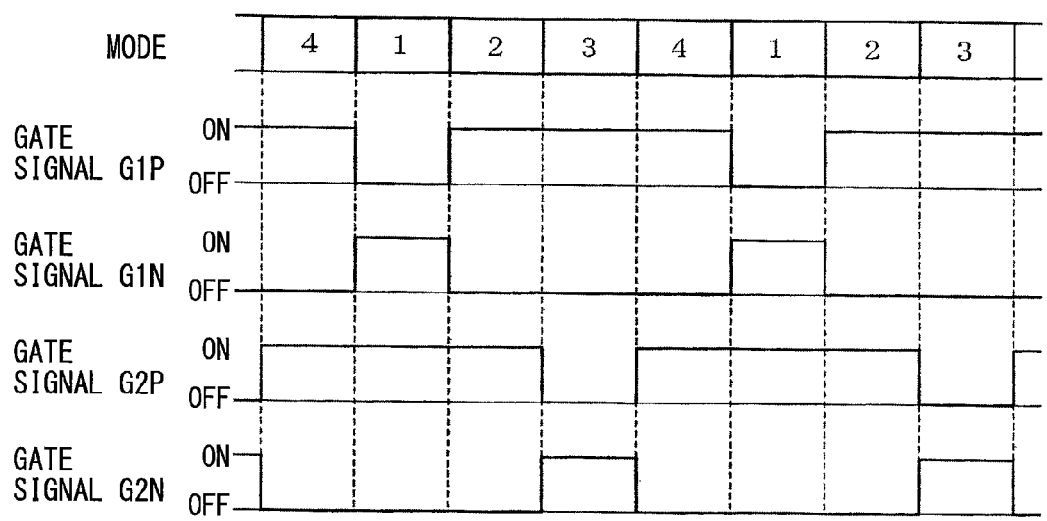
FIG. 11 is a waveform chart illustrating waveforms corresponding to respective switching modes according to the fourth embodiment.

As shown in FIG. 11, the gate signals G1P and G2P of the transistors Q1 and Q2 are the same as the gate signals G1 and G2 of the first embodiment. The control circuit 12 drives the transistors Q121, Q122, Q123 and Q124, which are connected on a route from the capacitors forming the first storage circuit S1 to the capacitors forming the second storage circuit S2 following the series path P, according to a gate signal G1N that is inverted from the gate signal G1P.

The control circuit 12 drives the transistors Q211, Q212, Q213 and Q214, which are connected on a route from the capacitors forming the second storage circuit S2 to the capacitors forming the first storage circuit S1 following the series path P, according to a gate signal G2N that is inverted from the gate signal G2P. The end transistor Qt is driven by the gate signal G1N.

The gate signal GIN of the transistors Q121, Q122, Q123 and Q124 can be generated by the voltage of the capacitors C11, C12, C13 and C14, respectively, as a power source voltage. The gate signal G2N of the transistor Q211, Q212 and Q213 can be generated by the voltage of the capacitors C22, C23 and C24, respectively, as a power source voltage.

The power converter 15 does not have capacitors that serve as power sources for the transistor Q214 and the end transistor Qt. If necessary, an additional capacitor may be further connected to the upper end of the storage circuit S2 in series, and a diode may be connected between an upper terminal of the additional capacitor and the drain of the transistor Q214. In such a case, the electric charge stored in the additional capacitor can be used as the power source for driving the transistor Q214.

In a case where a power source for driving the end transistor Qt is necessary, an additional capacitor may be further connected to the upper end of the storage circuit S1 in series, and a diode having an anode connected to an upper end of the additional capacitor may be connected.

In the present embodiment, synchronous rectification is performed. Therefore, conduction loss caused by a forward voltage of the diodes can be reduced, and efficiency can be further improved. It is not necessary to separately provide the power source voltage of the transistors Q121, Q122, Q123 and Q124 and the transistors Q211, Q212 and Q213. Therefore, the structure of the circuit can be simplified.

Fifth Embodiment

A fifth embodiment will be described with reference to FIGS. 12 and 13.

Figure 12:
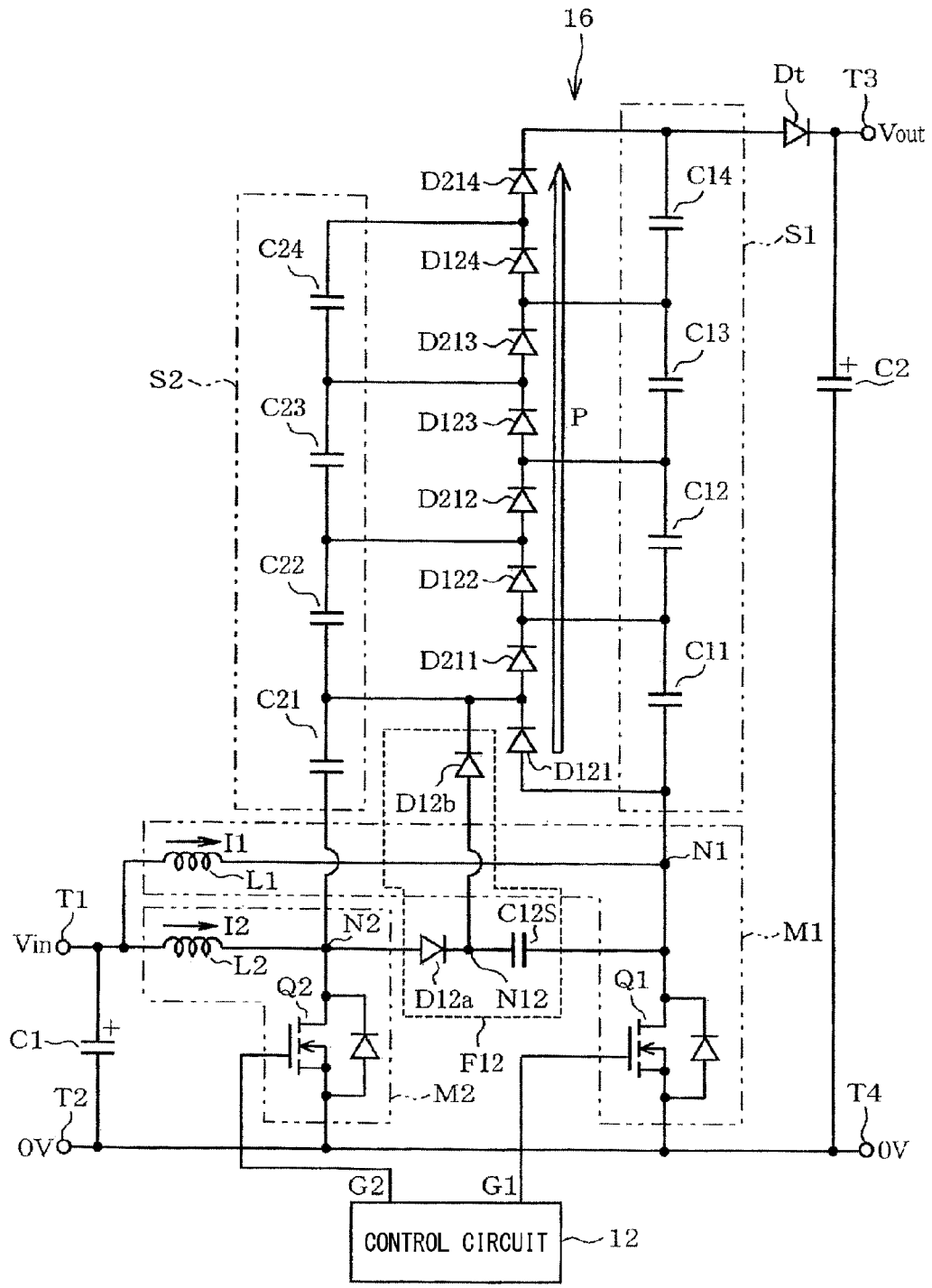
FIG. 12 is a diagram illustrating a schematic structure of a power converter according to a fifth embodiment of the present disclosure.

A power converter 16 shown in FIG. 12 is provided by adding a snubber circuit F12 to the power converter 11 shown in FIG. 1. The snubber circuit F12 includes diodes D12$a$ and D12$b$ and a capacitor C12$s$. The diode D12$a$ and the diode D12$b$ correspond to a snubber first rectification element and a snubber second rectification element, respectively. The capacitor C12S corresponds to a snubber storage element.

The capacitor C12S and the diode D12$a$ are connected in series to each other such that an intermediate node N12 of the capacitor C12S and the diode D12$a$ is interposed between the branch node N1 of the main current path M1 and the branch node N2 of the main current path M2. The diode D12$b$ is connected between the upper terminal of the capacitor C21 of the lowest stage of the second storage circuit S2 and the intermediate node N12. An anode of the diode D12$a$ is connected to the branch node N2. An anode of the diode D12$b$ is connected to the intermediate node N12.

The control circuit 12 performs the switching operation in a similar manner to that of the first embodiment shown in FIG. 2. FIGS. 13A, 13B, 13D and 13E are diagrams illustrating current paths in the mode 1, the mode 2, the mode 3 and the mode 4, respectively. FIG. 13C is a diagram illustrating a current path in a transition to the mode 3. FIG. 13F is a diagram illustrating a current path in a transition to the mode 1.

When the switching operation changes from the mode 2 to the mode 3, the current I2 flowing in the inductor L2 flows through the diode D12$a$ and the capacitor C12S of the snubber circuit F12, as shown in FIG. 13C. Thus, the capacitor C12S is charged. When the voltage of the capacitor C12S increases up to the voltage V(C11)-V(C21), the diodes D211, D212, D213 and D214 are turned on, as shown in FIG. 13D. Thus, the capacitors C11, C12, C13 and C14 are charged.

When the switching operation is changed from the mode 4 to the mode 1, the current I1 flowing in the inductor L1 flows through the capacitor C12S and the diode D12$b$, as shown in FIG. 13F. Thus, the capacitor C12S is discharged. In this case, the electric charge stored in the capacitor C12S transfer to the capacitor C21.

When the voltage V(C12S) of the capacitor C12S reduces to 0 V, the diodes D121, D122, D123 and D124 are turned on, as shown in FIG. 13A. Thus, the capacitors C21, C22, C23 and C24 are charged.

In the present embodiment, when the transistors Q1 and Q2 are turned off, a rapid change of a drain-to-source voltage can be restricted. Due to such a soft switching, the reliability of the power converter 16 improves, and EMI reduces. The charging and discharging of the capacitor C12S can be performed without loss, except for the loss in the diode. Therefore, a snubber energy stored in the capacitor C12S can be regenerated in an output side through the capacitor C21. As such, the efficiency of the power converter 16 improves.

Sixth Embodiment

Figure 14:
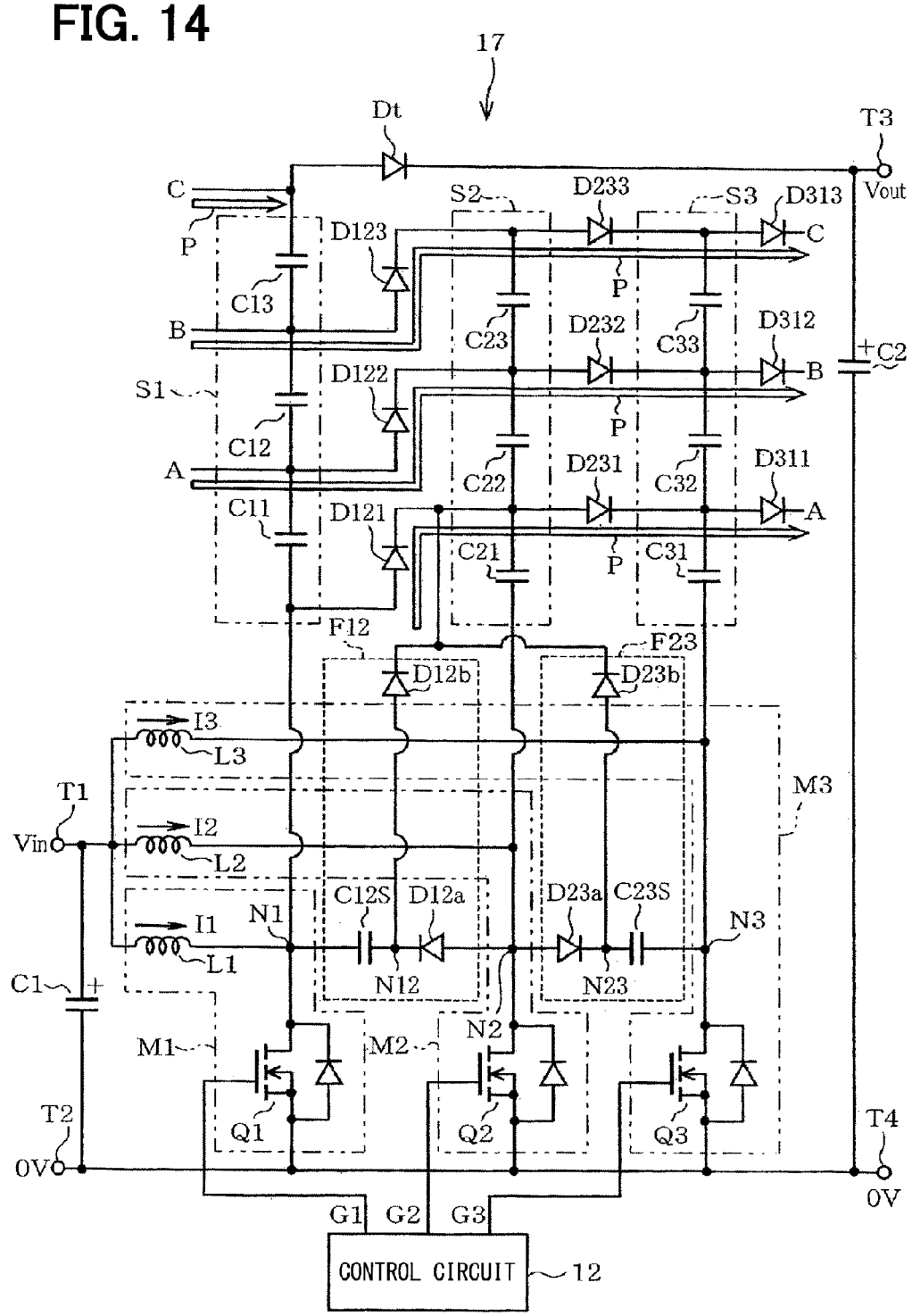
FIG. 14 is a diagram illustrating a schematic structure of a power converter according to a sixth embodiment of the present disclosure.

A sixth embodiment will be described with reference to FIG. 14. A power converter 17 shown in FIG. 14 is provided by adding snubber circuits F12 and F23 to the three-phase power converter 13 shown in FIG. 4. The snubber circuits F12 and F23 have the similar structure to that of the snubber circuit F12 shown in FIG. 12

The snubber circuit F12 includes the capacitor C12S and the diode D12$a$ connected in series to each other through the intermediate node N12, between the branch node N1 and the branch node N2. The snubber circuit F12 further includes the diode D12$b$.

The snubber circuit F23 includes a diode D23$a$ and a capacitor C23S connected in series to each other through an intermediate node N23, between the branch node N2 and the branch node N3. The snubber circuit F23 further includes a diode D23$b$.

A cathode of the diode D12$b$ and a cathode of the diode D23$b$ are connected to the upper terminal of the capacitor C21 on the lowest stage of the second storage circuit S2. One end of the snubber circuit F12 is connected to the second main current path M2. Likewise, one end of the snubber circuit F23 is connected to the second main current path M2. In such snubber circuits F12 and F23, an anode of the diode D12$a$ and an anode of the diode D23$a$ need to be connected to the main current path M2.

The control circuit 12 performs the switching operation in the similar manner to that of the second embodiment shown in FIGS. 5 and 7.

For example, in the case where the duty ratio is in the range from 66% to 100%, as shown in FIG. 7, when the switching operation changes from the mode 2 to the mode 3, the current I2 flowing in the inductor L2 flows through the diode D12$a$ and the capacitor C12S of the snubber circuit 12 to charge the capacitor C12S, as well as flows through the diode D23$a$ and the capacitor C23S of the snubber circuit F23 to charge the capacitor C23S.

When the voltage V(C12S) of the capacitor C12S and the voltage V(C23S) of the capacitor C23S increase up to the voltage V(C31)-V(C21), the diodes D231, D232 and D233 are turned on. Thus, the capacitors C31, C32 and C33 are charged.

When the switching operation changes from the mode 4 to the mode 5, the current I3 flowing in the inductor L3 flows through the capacitor C23S and the diode D23$b$ of the snubber circuit F23. Thus, the capacitor C23S is discharged. In this case, the electric charge stored in the capacitor C23S is transferred to the capacitor C21.

When the voltage V(C23S) of the capacitor C23S reduces to 0 V, the diodes D311, D312 and D313 are turned on. Thus, the capacitors C11, C12 and C13 are charged.

When the switching operation changes from the mode 6 to the mode 1, the current I1 flowing in the inductor L1 flows through the capacitor C12S and the diode D12$b$ of the snubber circuit F12. Thus, the capacitor C12S is discharged. In this case, the electric charge stored in the capacitor C12S is transferred to the capacitor C21. When the voltage V(C12S) of the capacitor C12S reduces to 0 V, the diodes D121, D122 and D123 are turned on. Thus, the capacitors C21, C22 and C23 are charged.

Also in the present embodiment, when the transistors Q1, Q2 and Q3 are turned off, the rapid change of the drain-to-source voltage can be restricted. Since the snubber energy is regenerated to the output side, the effects similar to those of the fifth embodiment can be achieved.

Seventh Embodiment

Figure 15:
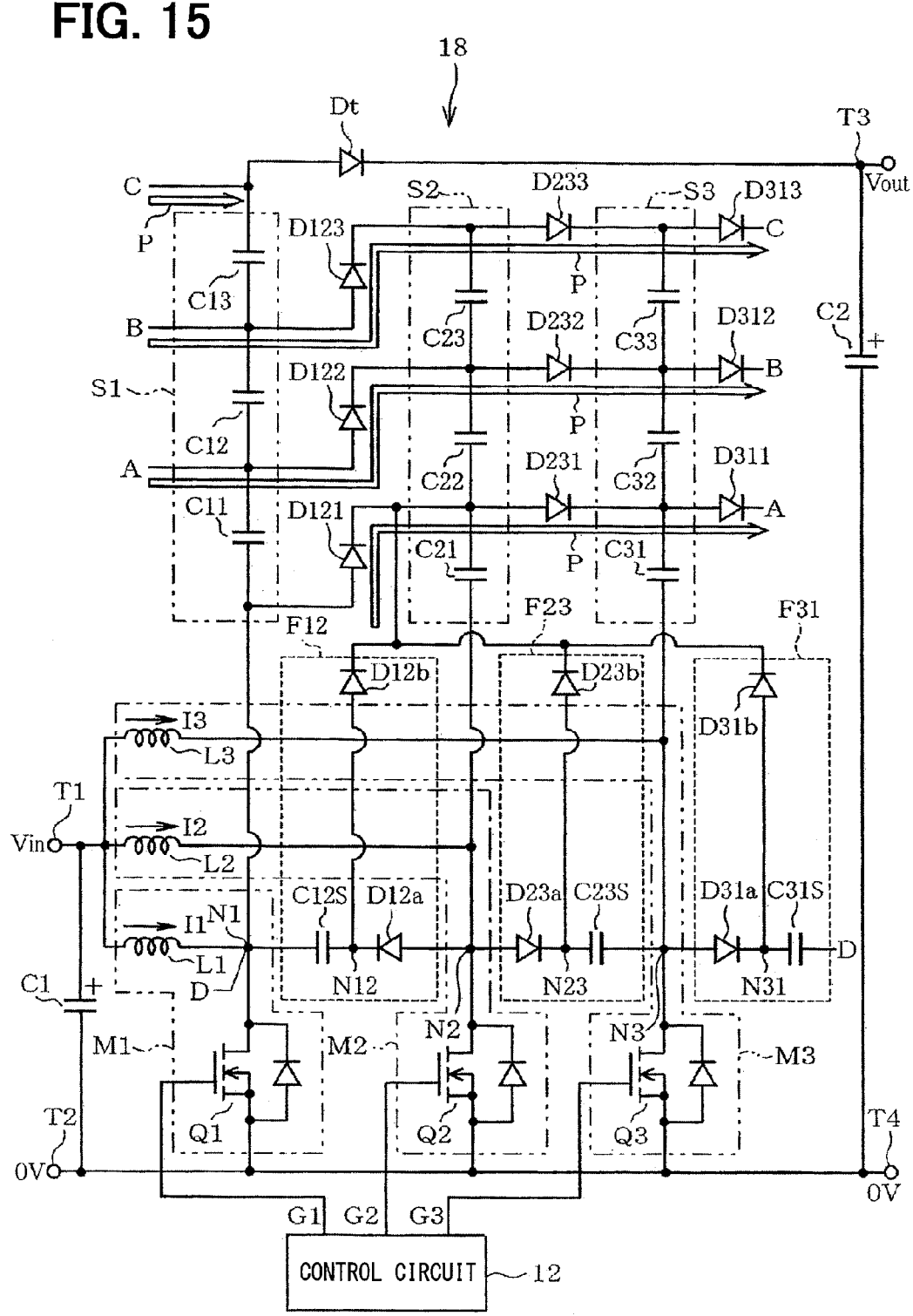
FIG. 15 is a diagram illustrating a schematic structure of a power converter according to a seventh embodiment of the present disclosure.

A seventh embodiment will be described with reference to FIG. 15.

A power converter 18 shown in FIG. 14 is provided by adding a snubber circuit F31 to the power converter 17 shown in FIG. 14. The snubber circuit F23 includes a diode D31a and a capacitor C31s connected in series to each other through an intermediate node N31, between the branch node N3 and the branch node N1. The snubber circuit F23 further includes a diode D31b. In FIG. 15, one point D connected to the other point D.

A cathode of the diode D31b is connected to an upper terminal of the capacitor C21 on the lowest stage of the second storage circuit S2. Differently from the snubber circuits F12 and F23, the snubber circuit F31 is not connected to the second main current path M2. Therefore, it is arbitrary to any of the branch nodes N3 and N1 each of the diode D31a and the capacitor C31S is connected.

In the present embodiment, in the case where the duty ratio is in the range from 66% to 100%, as shown in FIG. 7, when the switching operation changes from the mode 6 to the mode 1, the current I1 flowing in the inductor L1 discharges the capacitor C31S and C12S. When the switching operation changes from the mode 2 to the mode 3, the current I2 flowing in the inductor L2 charges the capacitors C12S and C23S. When the switching operation changes from the mode 4 to the mode 5, the current I3 flowing in the inductor L3 discharges the capacitor C23S, and charges the capacitor C31S. That is, when a transition in which any one of the transistors Q1, Q2 and Q3 is turned off occurs, any two of the snubber capacitors are charged and discharged. Therefore, the rapid change of the drain-to-source voltage can be further restricted.

Eighth Embodiment

Figure 16:
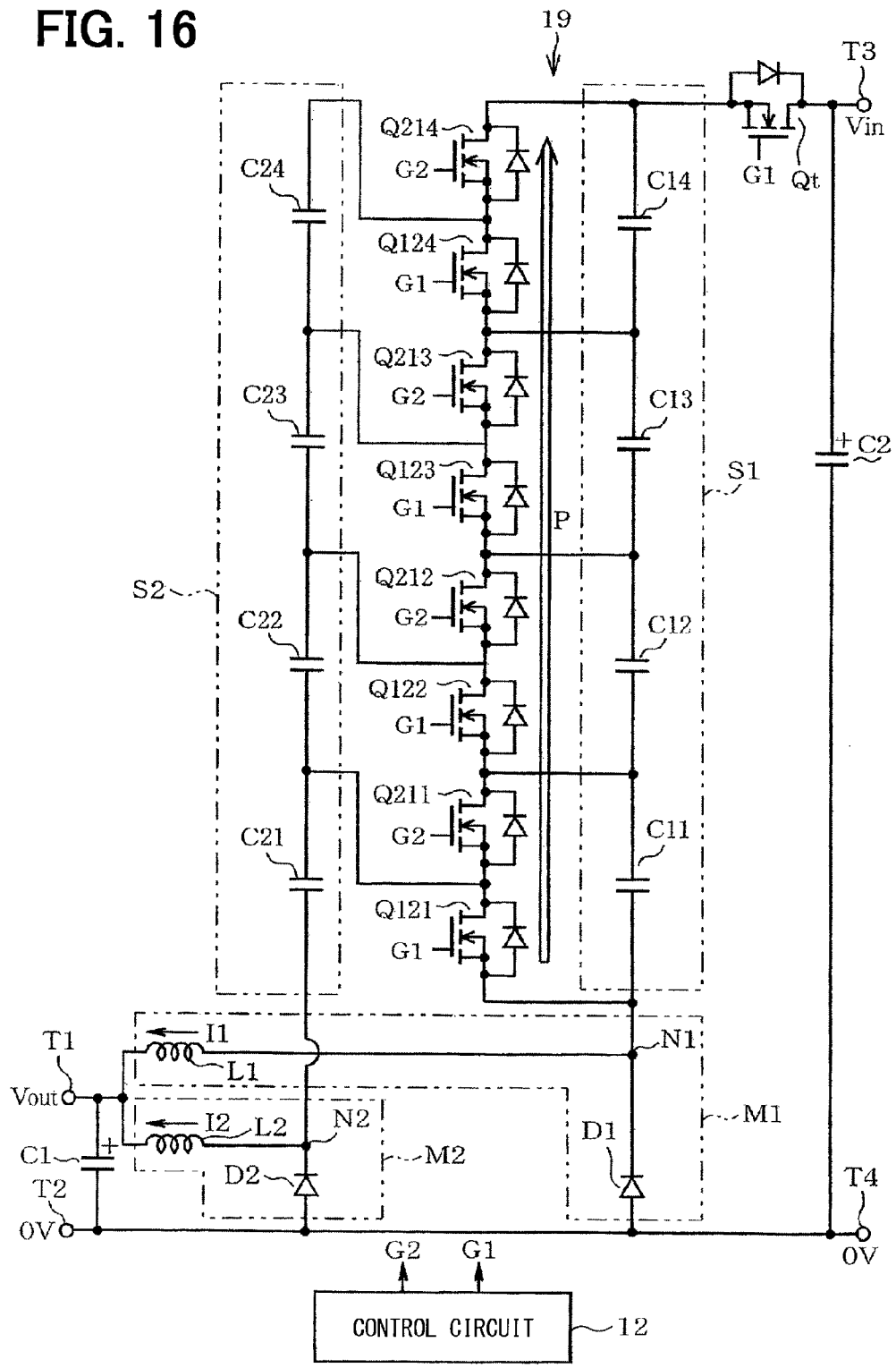
FIG. 16 is a diagram illustrating a schematic structure of a power converter according to an eighth embodiment of the present disclosure.
Figure 17:
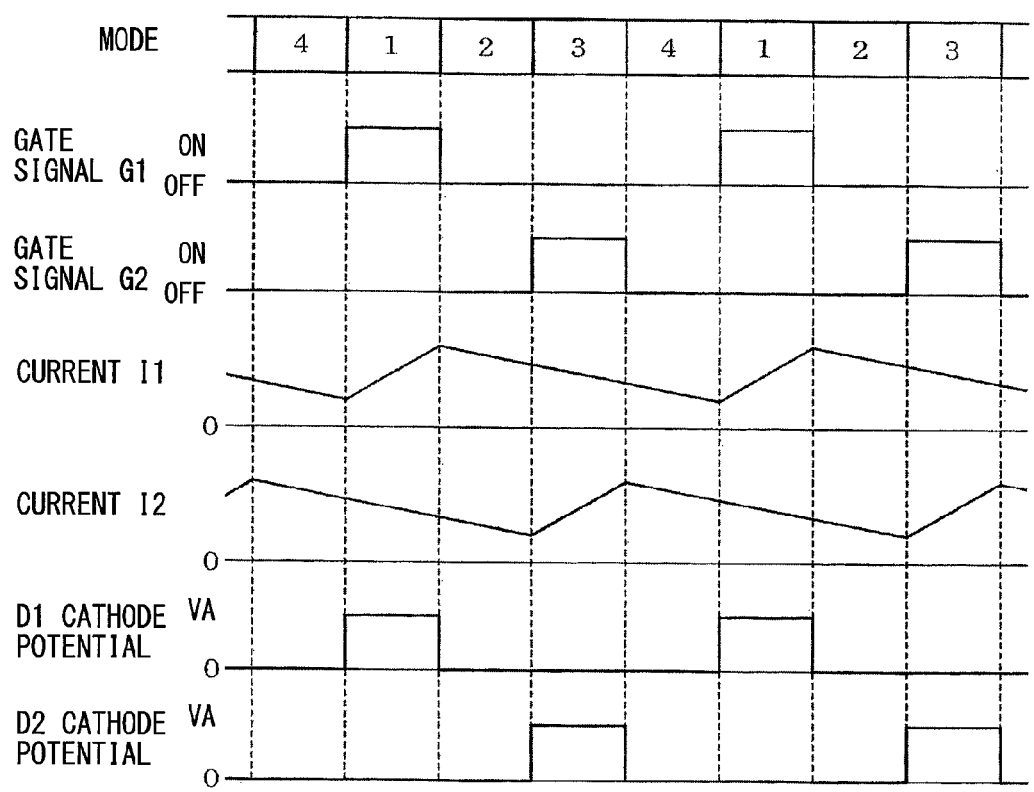
FIG. 17 is a waveform chart illustrating waveforms corresponding to respective switching modes according to the eighth embodiment.

An eighth embodiment will be described with reference to FIGS. 16 to 18.

A power converter 19 is a non-inverted buck circuit that bucks the voltage Vin inputted from a pair of high-voltage side input terminals T3 and T4, and outputs the bucked voltage Vout from a pair of low-voltage side output terminals T1 and T2.

Between the output terminal T1 and the output terminal T2, N systems of main current paths are connected in parallel. In the present embodiment, N is two. Thus, two systems of the main current paths M1 and M2 are connected in parallel between the output terminals T1 and T2. In the main current path M1, the inductor L1 and the diode D1 are connected in series to each other through the branch node N1. In the main current path M2, the inductor L2 and the diode D2 are connected in series to each other through the branch node N2.

The diodes D1 and D2 are main restriction elements that restrict conduction currents. The storage circuits S1 and S2, the transistors Q121 to Q214, and the end transistor Qt have the same structure as those of the power converter 15 of the fourth embodiment shown in FIG. 10.

Next, an operation of the present embodiment will be described with reference to FIGS. 17 and 18.

All of the transistors are sorted into a first sub restriction element group and a second sub restriction element group.

The first sub restriction element group is made of the transistors Q121, Q122, Q123, Q124 and Qt. The sources, corresponding to the element terminals, of the transistors Q121, Q122, Q123, Q124 and Qt are connected to the same storage circuit S1. The second sub restriction element group is made of the transistors Q211, Q212, Q213 and Q214. The sources, corresponding to the element terminals, of the transistors Q211, Q212, Q213 and Q214 are connected to the storage circuit S2.

The control circuit 12 controls each of the transistors of the first sub restriction element group and each of the transistors of the second sub restriction element group according to the periodic gate signals G1 and G2, so that each transistor is controlled to the on state only for a predetermined charge transmission period after being controlled to the off state. In this case, the control circuits 12 controls the transistors of the first sub restriction element group and the transistors of the second sub restriction element group such that at least one of the first sub restriction element group and the second sub restriction element group is in the off state.

In the present embodiment, the gate signals G1 and G2 having the same wave form with a phase difference of 180°. Therefore, the duty ratio taken by the gate signals G1 and G2 is higher than 0% and lower than 50%. FIG. 17 is a waveform chart illustrating the modes and waveforms of the gate signals G1 and G2, the currents I1 and I2 flowing in the inductors L1 and L2, and cathode potentials of the diodes D1 and D2.

Figure 18A:
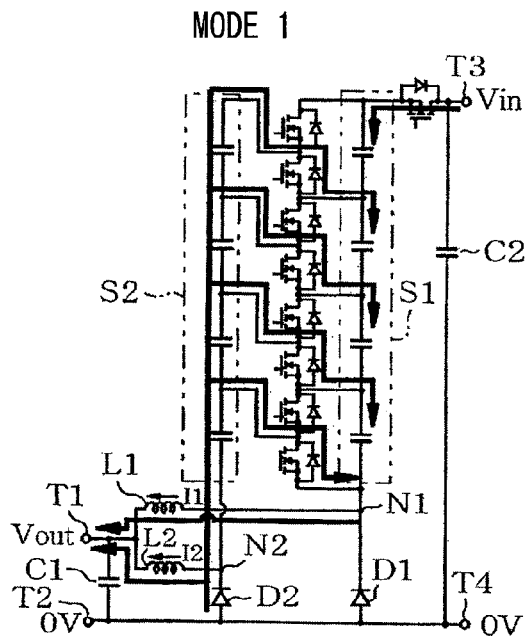
FIGS. 18A to 18C are diagrams illustrating current paths in the respective switching modes according to the eighth embodiment.
Figure 18B:
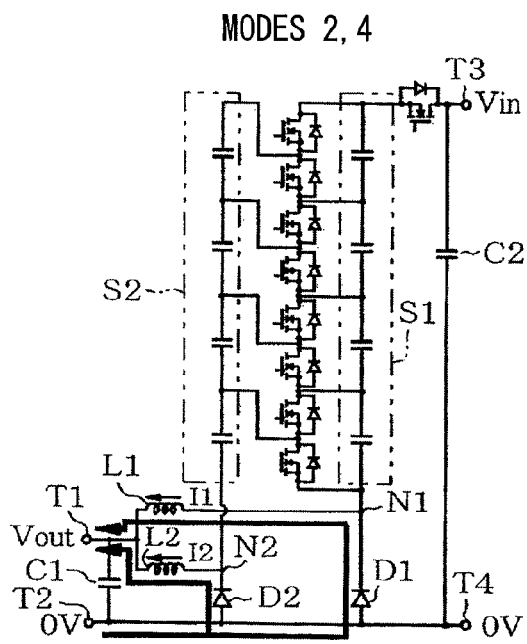
Figure 18C:
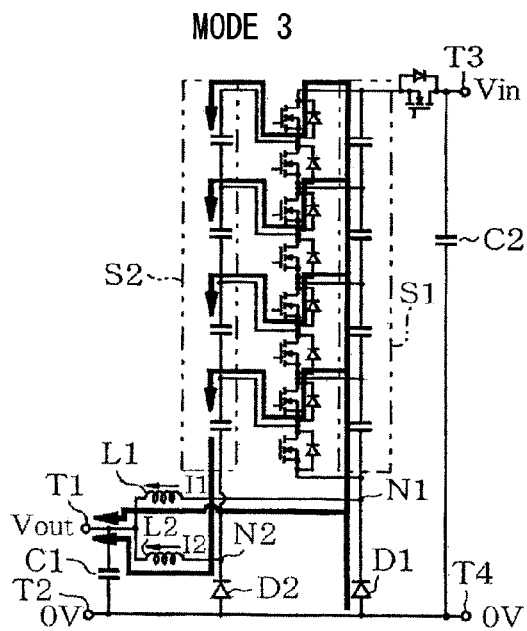

FIGS. 18A to 18C are diagrams illustrating current paths in the mode 1, the modes 2 and 4, and the mode 3, respectively. In the mode 4, all of the transistors are turned off, and the currents I1 and I2 of the inductors L1 and L2 flow back through the diodes D1 and D2, respectively.

When the switching operation changes from the mode 4 to the mode 1, the first sub restriction element group is turned on, and the electric charges transfer from the capacitors C22, C23 and C24 of the storage circuit S2 to the capacitors C11, C12 and C13 of the storage circuit S1 through the transistors Q122, Q123 and Q124. Further, a charge current flows to the storage circuit S1 from the high-voltage side input terminal T3 through the transistor Qt. These charge currents and the current flowing through the transistor Q121 from the capacitor C21 flow into the inductor L1.

When the switching operation changes from the mode 2 to the mode 3, the second sub restriction element group is turned on, and the electric charges transfer from the capacitors C11, C12, C13 and C14 of the storage circuit S1 to the capacitors C21, C22, C23 and C24 of the storage circuit S2 through the transistors Q211, Q212, Q213 and Q214. This charge current flows into the inductor L2. The transistor Qt is on the off state.

By this operation, the voltage of the capacitor C21 is VA, and the voltages of the other capacitors are 2VA. The potential of the cathode of the diode D1 in the mode 1 and the potential of the cathode of the diode D2 in the mode 3 are VA. The input voltage Vin and the output voltage Vout relative to the duty ratio D can be obtained from the following expression (11) that indicates a time average of the voltage applied to each inductor being zero.

$$D(Vout-VA)+(1-D)Vout=0 \tag{11}$$

Based on the expression (11), the voltage VA has a value given by the following expression (12).

$$VA=1/D \times Vout \tag{12}$$

In the mode 1, the input current flows through the diode Dt. Therefore, when the number of stages of the capacitors of the storage circuits S1 and S2 is defined as Ns, the input voltage Vin is given by the following expression (13). Therefore, the output voltage Vout is given by the following expression (14).

In the present embodiment, the number Ns of the stages is four.

$$Vin=(2Ns+1)VA=(2Ns+1)/D\times Vout \tag{13}$$

$$Vout=D/(2Ns+1)\times Vin \tag{14}$$

As described above, the power converter 19 of the present embodiment is the non-inverted buck circuit in which the output current ripple is reduced. Further, the effects similar to those of the first embodiment can be achieved.

Ninth Embodiment

Figure 19:
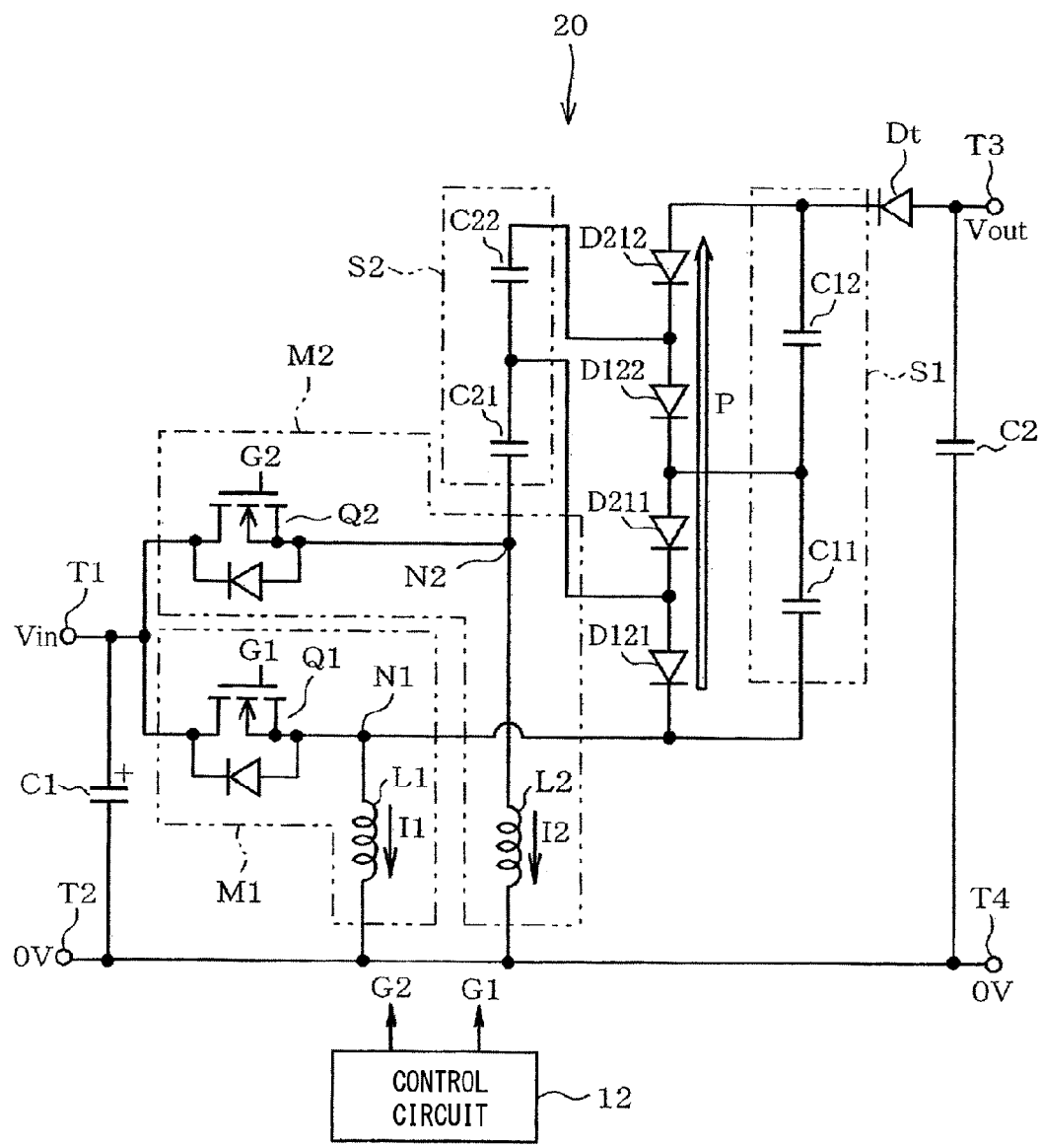
FIG. 19 is a diagram illustrating a schematic structure of a power converter according to a ninth embodiment of the present disclosure.

A ninth embodiment will be described with reference to FIGS. 19 to 21.

A power converter 20 shown in FIG. 10 is an inversion boost circuit that inverts and boosts the voltage Vin inputted from the input terminals T1 and T2, and outputs the boosted voltage Vout from the output terminal T3 and T4. Therefore, the order of connection of the inductors L1 and L2 and the transistors M1 and M2 of the main current paths M1 and M2 are opposite from that of the power converter 11 shown in FIG. 1. The storage circuits S1 and S2 form a two-stage structure, and the polarity of the diodes D121 to D212 and Dt is opposite from that of the power converter 11 shown in FIG. 1.

Figure 20:
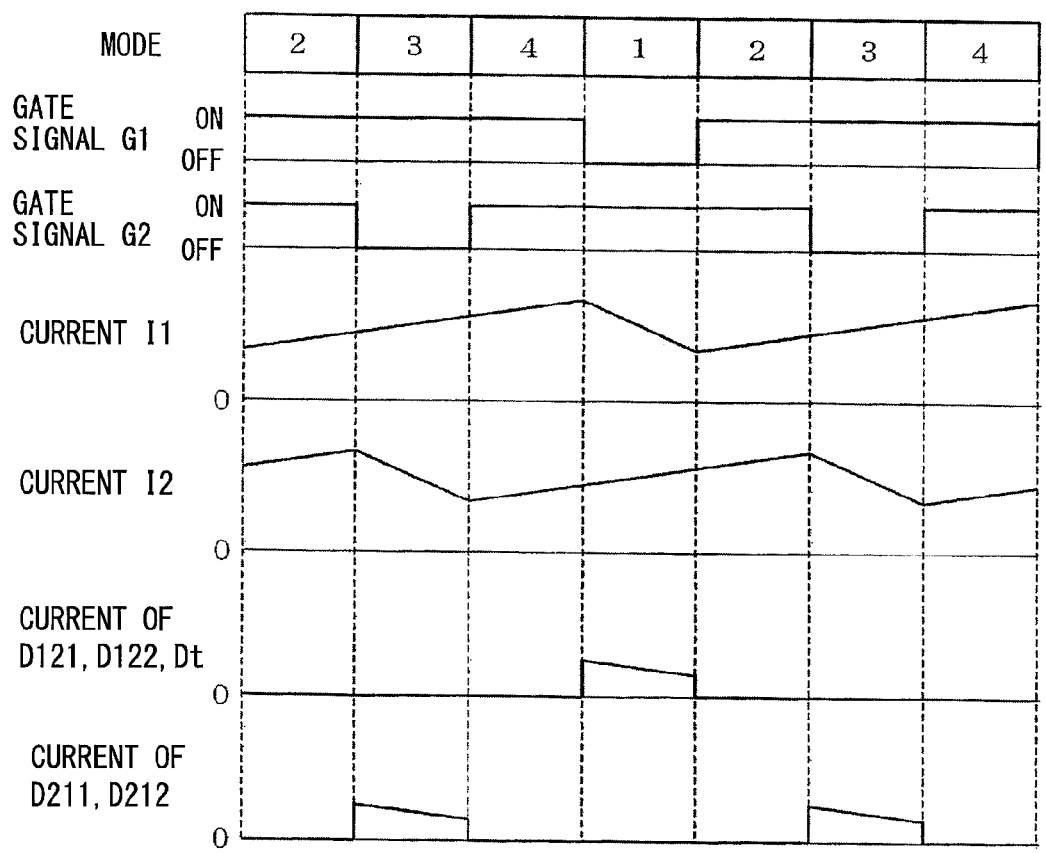
FIG. 20 is a waveform chart illustrating waveforms corresponding to respective switching modes according to the ninth embodiment.
Figure 21A:
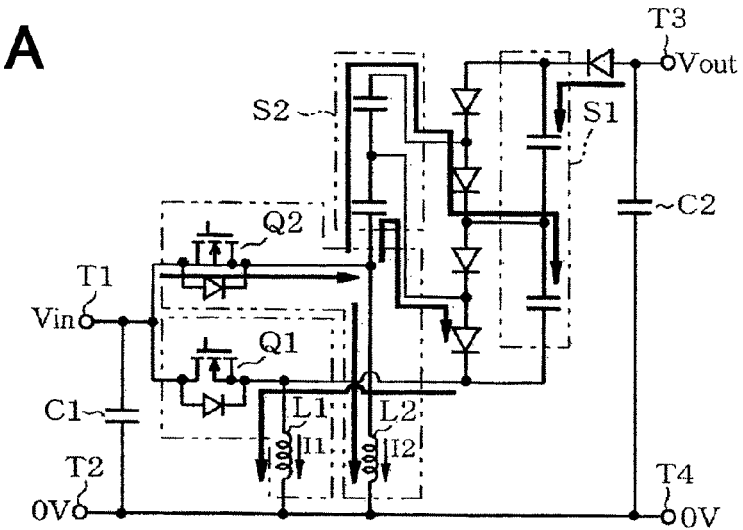
FIGS. 21A to 21C are diagrams illustrating current paths in the respective switching modes according to the ninth embodiment.
Figure 21B:
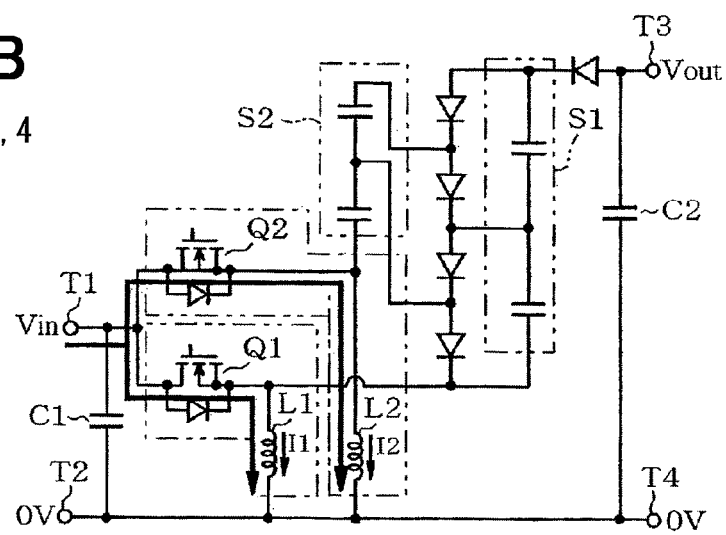
Figure 21C:
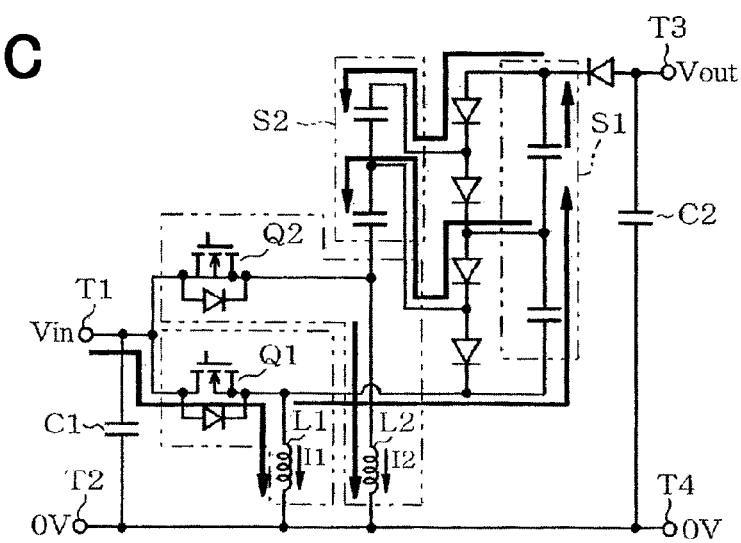

The gate signals G1 and G2 outputted from the control circuit 12 are the same as those of the first embodiment shown in FIG. 20. FIGS. 21A to 21C are diagrams illustrating current paths in the mode 1, the modes 2 and 4, and the mode 3, respectively.

In the mode 4, the transistors Q1 and Q2 are turned on, and the currents I1 and I2 of the inductors L1 and L2 increase. When the switching operation changes from the mode 4 to the mode 1, the transistor Q1 is turned off, and the potential of the storage circuit S1 is lowered. The diodes D121, D122 and Dt are turned on. With this, the current I1 flows into the inductor L1 from the storage circuit S1 and the capacitor C21, and the capacitors C11 and C12 of the storage circuit S1 are charged.

When the switching operation changes to the mode 3 from the mode 2, the transistor Q2 is turned off, and the potential of the storage circuit S2. The diodes D211 and D212 are turned on. With this, the current I2 flows into the inductor L2 from the storage circuit S2, and the capacitors C21 and C22 of the storage circuit S2 are charged.

By this operation, the voltage of the capacitor C21 is −VA, and the voltages of the other capacitors are −2VA. The voltage applied to the inductor L1 in the mode 1 and the voltage applied to the inductor L2 in the mode 3 are Vin−VA.

Since a time average of the voltage applied to each inductor needs to be zero, the following expression (15) is established.

$$D\cdot Vin+(1-D)(Vin-VA)=0 \tag{15}$$

Based on the expression (15), the voltage VA has a value given by the following expression (16).

$$VA=1/(1-D)\times Vin \tag{16}$$

In the mode 1, the input current flows through the diode Dt. Therefore, when the number of stages of the capacitors of the storage circuits S1 and S2 are defined as Ns, the output voltage Vout is given by the following expression (17). In the present embodiment, the number Ns is two.

$$Vout=Vin-(2Ns+1)VA=Vin-(2Ns+1)/(1-D)\times Vin \tag{17}$$

When the state where the transistors Q1 and Q2 are off is regularly present, the capacitors C11, C12, C21 and C22 are discharged. Therefore, the duty ratio of the gate signals G1 and G2 regularly applied is higher than 50% and lower than 100%. When a relation of D>0.5 is applied to the expression (17), the output voltage Vout satisfies the following expression (18).

$$Vout<-(4Ns+1)\times Vin \tag{18}$$

As described above, the power converter 20 of the present embodiment is the inversion boost circuit that outputs the negative voltage having an absolute value greater than that of the input voltage Vin. In addition, the effects similar to the first embodiment can be achieved.

Tenth Embodiment

Figure 22:
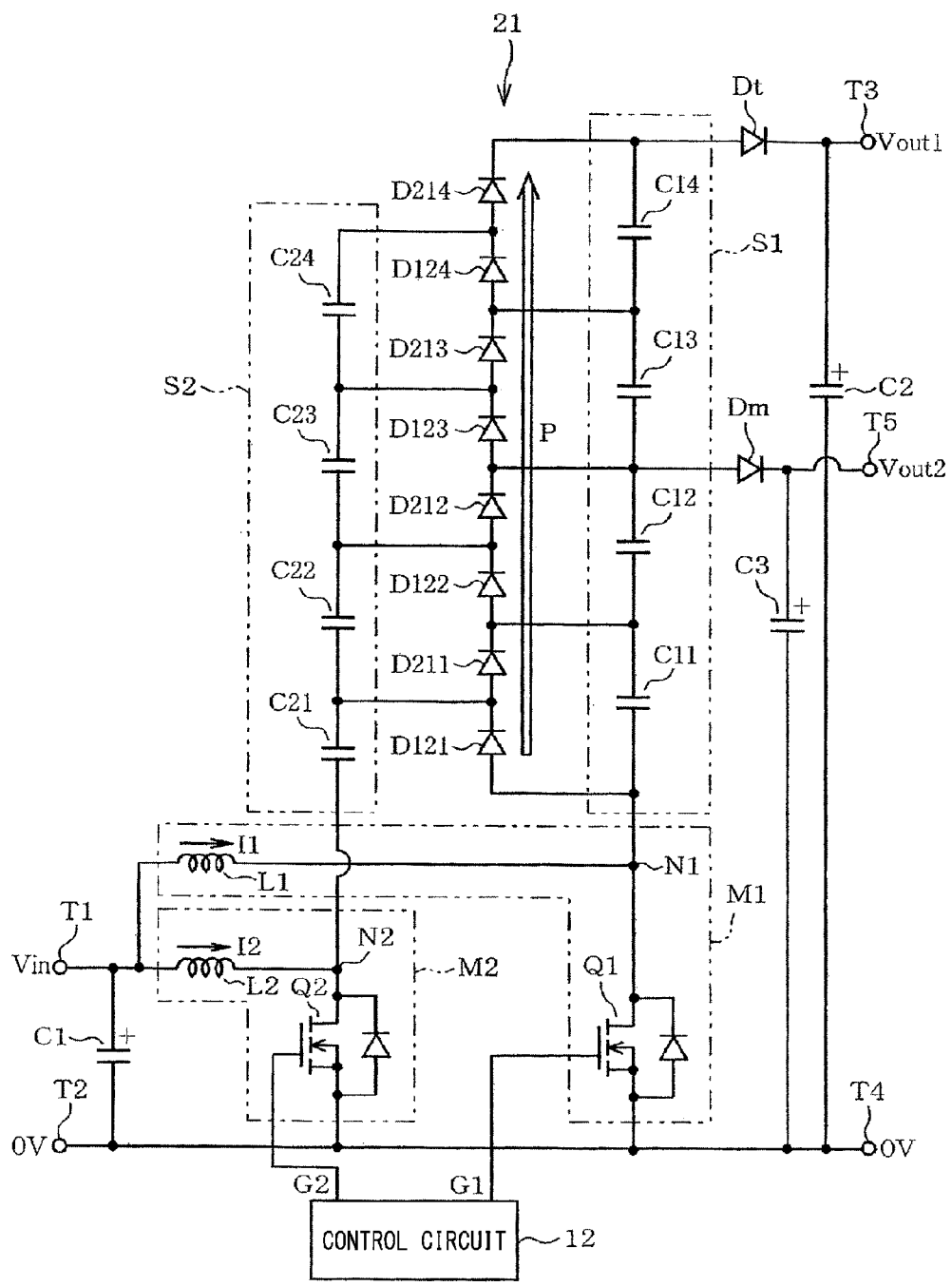
FIG. 22 is a diagram illustrating a schematic structure of a power converter according to a tenth embodiment of the present disclosure.

A tenth embodiment will be described with reference to FIG. 22.

A power converter 21 is provided by adding a structure of leading out a voltage Vout2 from between output terminals T5 and T4 to a structure similar to the power converter 11 shown in FIG. 1 that outputs a voltage Vout1 from between the output terminal T3 and T4. In this case, the output terminals T5 and T4 correspond to intermediate input/output terminals, and a smoothing capacitor C3 is connected between the output terminals T5 and T4.

A diode Dm is connected between the upper terminal of the capacitor C12 of the storage circuit S1 and the output terminal T5 to have the same polarity as that of the end diode Dt, that is, to have the anode adjacent to the storage circuit S1. The diode Dm corresponds to an intermediate sub-restriction element for intermediate leading, that is, for leading out an intermediate output. An output current flows in the diode Dm in the mode 1 where the transistor Q1 is turned off. Based on the expression (4), the output voltage Vout2 is defined as 5VA=5/(1−D)×Vin.

In the present embodiment, two systems of boosted voltages Vout1 and Vout 2 are obtained from one power converter 21. Therefore, the size of the power converter 21 can be reduced, as compared with a structure in which power converters are correspondingly provided for the output voltage Vout1 and Vout 2. A position to lead out an intermediate output is not limited to the upper terminal of the capacitor C12. Outputs can be simultaneously obtained from any one of or plural terminals among the upper and lower terminals of the capacitors C11, C12 and C13, including the drain terminal of the transistor Q1, of the storage circuit S1 and the upper and lower terminals of the capacitors C21, C22, C23 and C24, including the drain terminal of the transistor Q2, of the storage circuit S2.

Eleventh Embodiment

An eleventh embodiment will be described with reference to FIG. 23.

Figure 23:
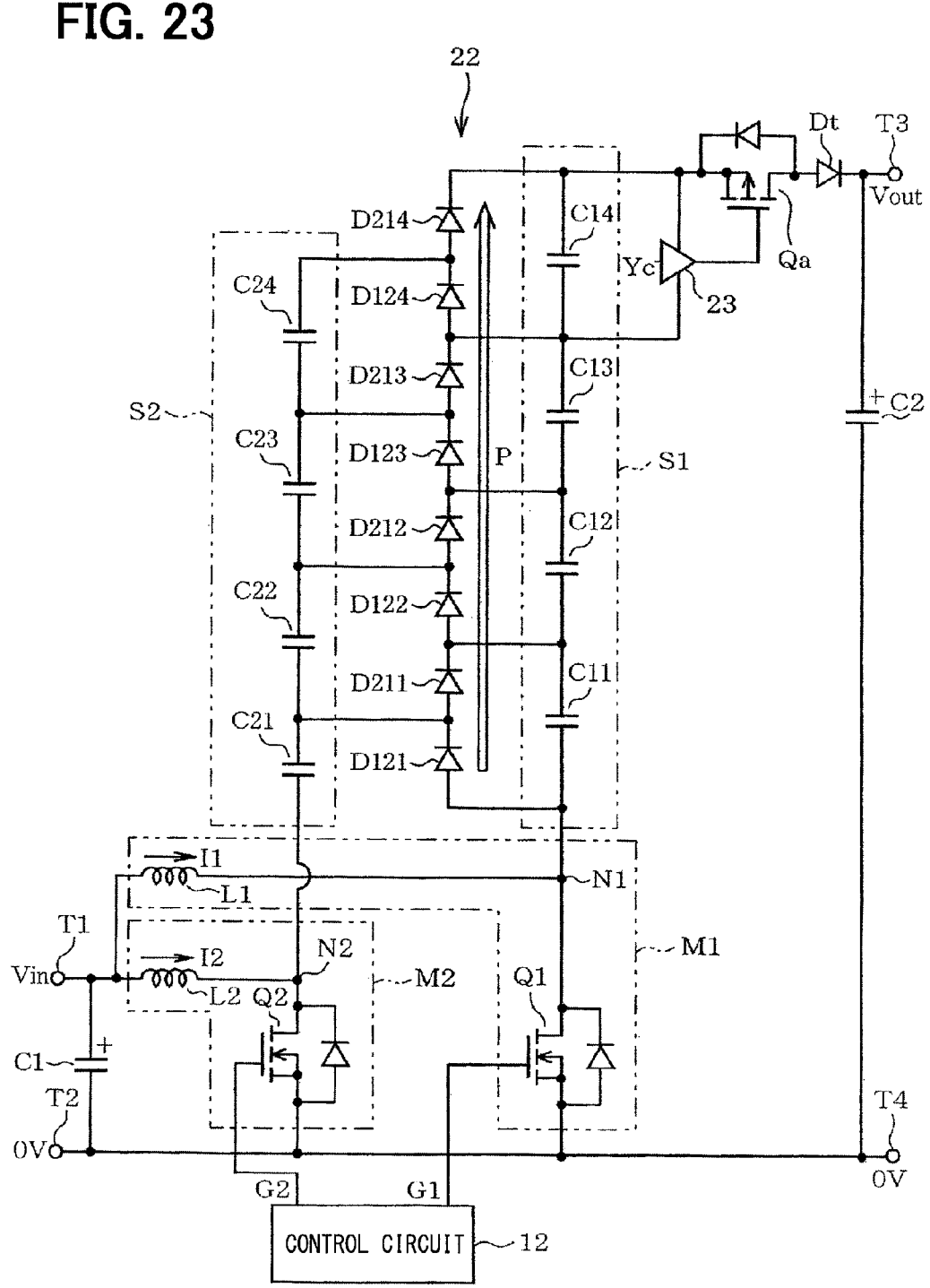
FIG. 23 is a diagram illustrating a schematic structure of a power converter according to an eleventh embodiment of the present disclosure.

A power converter 22 shown in FIG. 23 has a P channel type MOS transistor Qa in addition to the power converter 11 shown in FIG. 1. The P channel type MOS transistor Qa is connected to the end diode Dt in series. When the output current exceeds a threshold, or when the output voltage reduces lower than a threshold, a detection circuit (not shown) outputs an output abnormal signal Yc. When receiving the output abnormal signal Yc, the driver 23 outputs a gate signal to turn off the transistor Qa.

In the power converter 22 of the present embodiment, the output can be separated when an abnormality, such as an output short circuit or overload, occurs. The voltage of the capacitor C14 can be used as a power supply voltage of the driver 23. It is not necessary to separately provide a power source for driving the driver 23. As such, the structure of the circuit can be simplified.

Twelfth Embodiment

Figure 24:
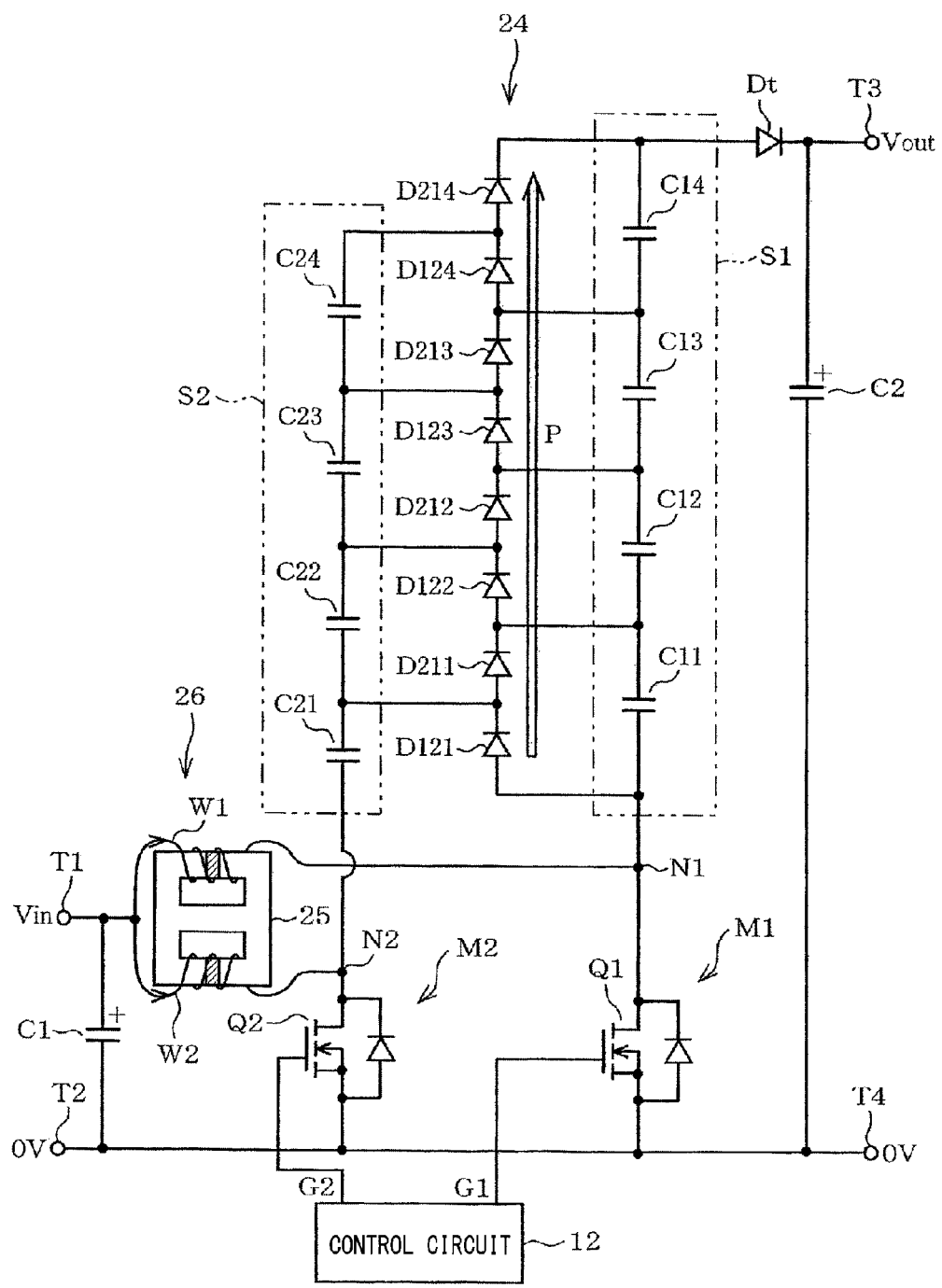
FIG. 24 is a diagram illustrating a schematic structure of a power converter according to a twelfth embodiment of the present disclosure.

A twelfth embodiment will be described with reference to FIG. 24.

A power converter 24 has a magnetic part 26 including two windings W1 and W2 sharing a magnetic core 25 with each other, in place of the inductors L1 and L2. The magnetic core 25 is made of an EE-type iron core. The magnetic core 25 has a middle leg portion and two outer leg portions on opposite outer sides of the middle leg portion across gaps. The winding W1 is wound around one of the outer leg portions, and the winding W2 is wound around the other of the outer leg portions. The winding W1 and the winding W2 are wound in directions such that DC components of the magnetic flux passing through the middle leg portion are cancelled to each other when being supplied with DC currents.

In the present embodiment, a total volume of the magnetic part 26 and a dead space in arrangement of the magnetic part 26 can be reduced, as compared with a structure in which independent multiple inductors are separately provided. A cross-sectional area of the middle leg portion can be reduced. With this, the magnetic core 25 can be reduced in size. As such, the size of the power converter 24 can be reduced.

Thirteenth Embodiment

Figure 25:
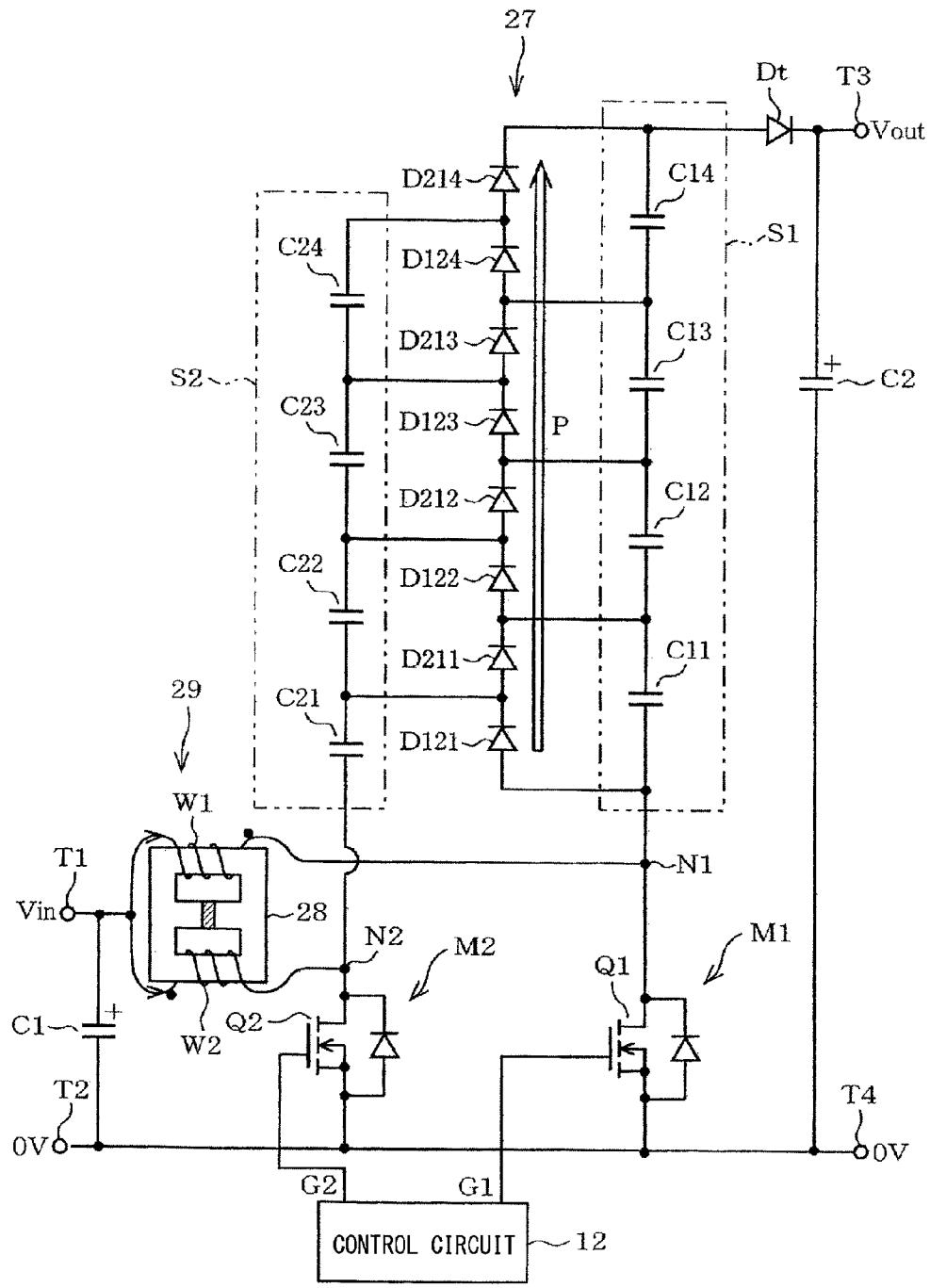
FIG. 25 is a diagram illustrating a schematic structure of a power converter according to a thirteenth embodiment of the present disclosure.

A thirteenth embodiment will be described with reference to FIG. 25.

A power converter 27 has a magnetic part 29 including two windings W1 and W2 that share a magnetic core 28 with each other, in place of the inductors L1 and L2. The magnetic core 28 is made of an EE-type iron core. A middle leg portion of the magnetic core 28 is formed with a gap. The winding W1 is wound around one outer leg portion, and the winding W2 is wound around another outer leg portion. The winding W1 and the winding W2 have a coupling shown in FIG. 25.

Also in the present embodiment, the total volume of the magnetic part 29 and the dead space in the arrangement of the magnetic part 29 can be reduced, as compared with the structure in which independent multiple inductors are separately provided. Also, when the duty ratio is near 50%, ripples of the input and output currents can be reduced. Therefore, this structure is effective to the case where very small ripples of the input and output currents need to be obtained at a specific boosting ratio.

In such a case, the ripples of the current flowing in the windings W1 and W2 can also be reduced. When the ripples of the currents of the windings are small, an occurrence of a skin effect can be reduced. Therefore, thinner windings W1 and W2 can be employed, and the total volume of the magnetic part can be further reduced.

Fourteenth Embodiment

Figure 26:
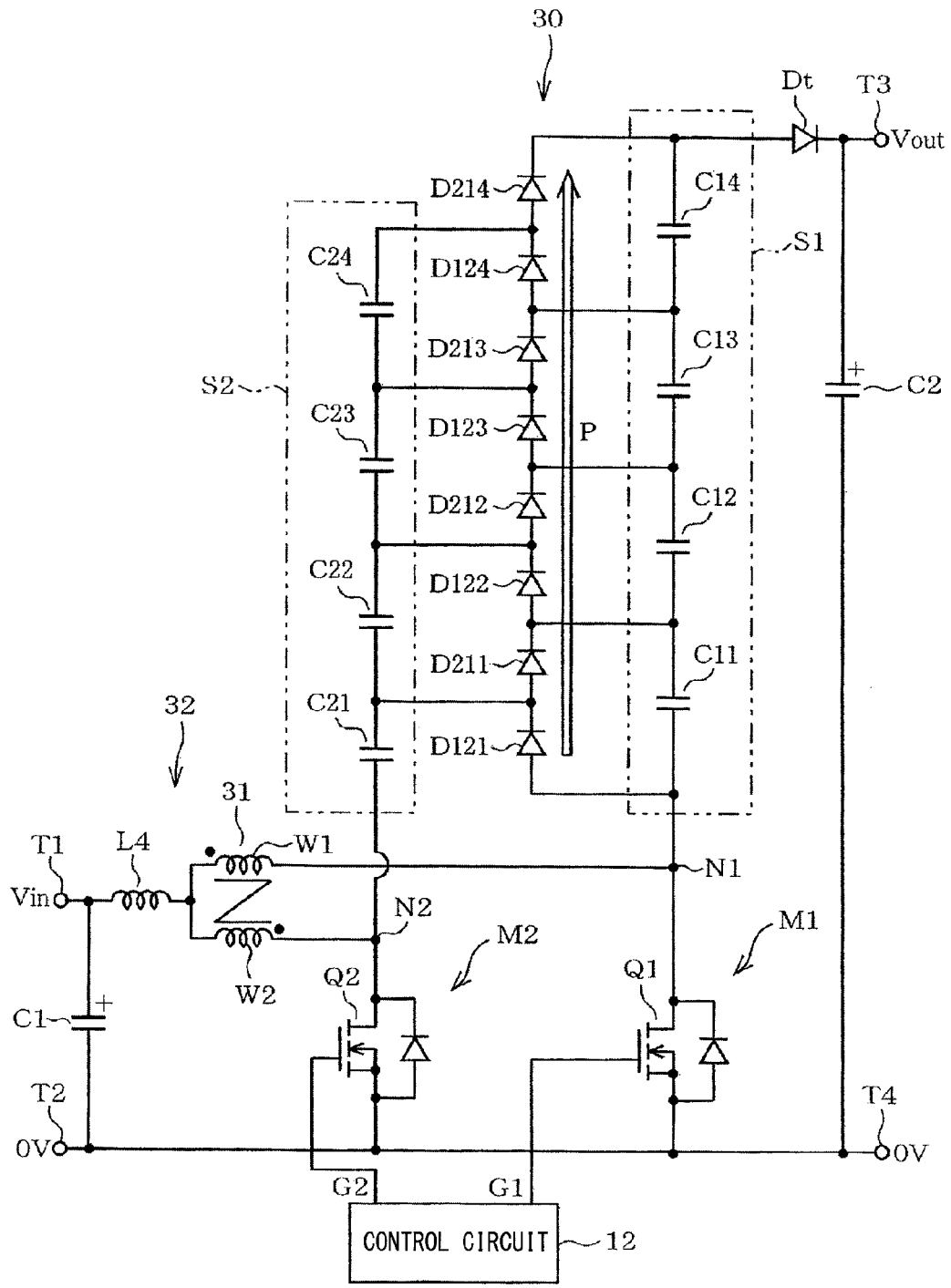
FIG. 26 is a diagram illustrating a schematic structure of a power converter according to a fourteenth embodiment of the present disclosure.

A fourteenth embodiment will be described with reference to FIG. 26.

The power converter 30 has a magnetic part 32 including an inductor L4 and a transformer 31, in place of the inductors L1 and L2. One end of the inductor L4 is connected to the input terminal T1, and the other end of the inductor L4 is commonly connected to one end of a primary winding W1 and one end of a secondary winding of the transformer 31. The other end of the primary winding W1 is connected to the branch node N1, and the other end of the secondary winding W2 is connected to the node N2. This structure is equivalent to the magnetic part 29 shown in FIG. 25. When the duty ratio is near 50%, the ripples of the input and output currents are very small.

Other Embodiments

Embodiments of the present disclosure are described hereinabove. However, the present disclosure will not be limited to the embodiments described above, but may be modified or expanded in various ways without departing from the gist of the present disclosure.

The main current paths and the storage circuits can be generally provided in N systems (N is an integer of 2 or more). The storage circuit can be provided by one or more capacitors stacked in series in at least one stage (preferably two stages or more).

Also in the second, and the fourth to fourteenth embodiments, the end sub-restriction element may be connected to the storage circuit S2 or the storage circuit S3, similarly to the third embodiment.

Also in the second, the third, and the fifth to fourteenth embodiments, the power converters can have a structure of synchronous rectification, similarly to the fourth embodiment.

Also in the third, the fourth, and the eighth to fourteenth embodiments, the power converters may be provided with the snubber circuit(s) similarly to the fifth to seventh embodiment. However, in the structure where the negative voltage is applied to the high-voltage terminals (high-voltage input/output terminals), that is, in the case where, among the high-voltage terminals, the potential of the non-common side terminal, which is not commonly connected, is lower than that of the common-side terminal, which is commonly connected, it is necessary to replace the rectification element of the snubber circuit such that the polarity of the rectification element of the snubber circuit is opposite to the polarity of that in the fifth to seventh embodiments.

Namely, in the fifth to seventh embodiment, the cathode of the snubber first rectification element and the anode of the snubber second rectification element are connected to the intermediate node. Alternatively, in the structure of being applied with the negative voltage, the anode of the snubber first rectification element and the cathode of the snubber second rectification element need to be connected to the intermediate node.

Also in the second to ninth, and eleventh to fourteenth embodiments, the power converters may have the structure with the intermediate terminals (intermediate input/output terminals), similarly to the structure of the tenth embodiment. The intermediate terminals are not limited to one pair. Namely, a plural pairs of the intermediate terminals may be provided. In such a case, plural systems of the output voltages can be obtained from one power converter, and plural systems of the voltages can be inputted to the one power converter.

In the tenth embodiment, one ends of the intermediate terminals are connected to the commonly connected terminals T2 and T4 to which the low-voltage terminals (low-voltage input/output terminals) and the high-voltage input/output terminals are connected. However, it is not always necessary that the one ends of the intermediate terminals are connected to the commonly connected terminals.

One end of the intermediate terminal may be connected to any terminal of the low-voltage terminals and the high-voltage terminals. One end of the intermediate terminal may be connected to any one end of another intermediate terminal.

Also in the second to tenth, and twelfth to fourteenth embodiments, a switch that is turned off according to input of the output abnormality signal Yc may be provided in series to the end sub restriction element, similarly to the eleventh embodiment. In such a case, the voltage of the capacitor forming the storage circuit may be used as a power source voltage of a driver for driving the switch.

Also in the second to eleventh embodiments, the magnetic parts 26, 29 and 32 of the twelfth, the thirteenth and the fourteenth embodiments may be employed.

The control circuit 12 may control the gate signals G1, G2 and G3 using separate PI controllers.

In a case where the main restriction element, the sub restriction elements and the end sub restriction element are provided by switches, such switches are not limited to the MOS transistors, but may be provided by various semiconductor switching elements, such as bipolar transistors, and IGBTs.

In the embodiments described above, the terminals T1 and T2 are the low-voltage terminals, and can be either input terminals or output terminals depending on the structures of the power converters. The terminals T1 and T2 may be referred to as low-voltage input/output terminals. The terminals T1 and T2 may also be referred to as a first low-voltage terminal and a second low-voltage terminal. Likewise, the terminals T3 and T4 are the high-voltage terminals, and can be either input terminals or output terminals depending on the structures of the power converters. The terminals T3 and T4 may be referred to as high-voltage input/output terminals. The terminals T3 and T4 may also be referred to as a first high-voltage terminal and a second low-voltage terminal. Further, the terminals T5 and T4 are the output terminals, but can be either intermediate input or output terminals depending on the structures of the power converters. Moreover, the terminals T5 and T4 may also be referred to as a first intermediate terminal and a second intermediate terminal.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A power converter comprising:
a pair of low-voltage terminals including a first low-voltage terminal and a second low-voltage terminal;
a pair of high-voltage terminals including a first high-voltage terminal and a second high-voltage terminal, the second high-voltage terminal being commonly connected to the second low-voltage terminal;
N systems of main current paths disposed between the first low-voltage terminal and the second low-voltage terminal, wherein N is an integer being 2 or more, each of the main current paths includes a magnetic part storing magnetic energy and a main restriction element restricting a conduction current, the magnetic part and the main restriction element are connected in series to each other through a branch node;
a plurality of storage circuits correspondingly provided for the main current paths, each of the storage circuits including one or more storage elements being stacked to one or more stages and being connected in series, each of the storage circuits having a lower end being connected to the branch node of a corresponding one of the main current paths;
a plurality of sub restriction elements each being connected between a terminal of the storage element of one of the storage circuits and a terminal of the storage element of another one of the storage circuits;
a smoothing storage element connected between the first high-voltage terminal and the second high-voltage terminal;
an end sub-restriction element, one end of which being connected to the first high-voltage terminal; and
a control circuit controlling at least one of the main restriction elements, the sub restriction elements, and the end sub-restriction element, wherein
the N systems of the main current paths and the storage circuits correspondingly connected to the main current paths are assigned with a sequential order from a first to an N-th,
a lower terminal of the storage element of each stage of the first storage circuit is connected to an upper terminal of the storage element of a corresponding stage of the second storage circuit through a corresponding one of the sub restriction elements,
an upper terminal of the storage element of each stage of each of the second to N-th storage circuits, except for the storage element being connected to the end sub-restriction element, is connected to an upper terminal of the storage element of a corresponding stage of a subsequent storage circuit through a corresponding one of the sub restriction elements,
the sub restriction elements are connected to one another through terminals thereof to define a series path of the sub restriction elements so that the sub restriction elements can be sequentially followed in a same polarity, the series path begins from the sub restriction element, one end of which is connected to the lower end of the first storage circuit, and ends by another one of the sub restriction elements,
the end sub-restriction element is connected between an upper terminal of the another one of the sub restriction elements ending the series path and the first high-voltage terminal,
through the series path, the upper terminals of all of the storage elements of the first to the N-th storage circuits are followed from the storage element on a lowest stage to the storage element on a highest stage in a predetermined order,
the sub restriction elements defining the series path are connected to have a predetermined connection polarity so that electric power is transmitted in a predetermined direction between the pair of low-voltage terminals and the pair of high-voltage terminals by transferring electric charge between the storage elements of the adjacent storage circuits,
all of the main restriction elements are provided by switches,
the sub restriction elements and the end sub-restriction element are provided by either rectification elements or switches,
the control circuit periodically switches on and off of the main restriction elements, and performs a switching operation to generate transfer of the electric charge in the series path according to the connection polarity,
wherein in the switching operation,
in a part of or an entirety of a period where one of the main restriction elements that is connected to the storage circuit to which one of the terminals of the sub restriction elements on a lower side in a connection of the sub restriction elements of the series path is connected is in an off state, the control circuit controls the corresponding sub restriction elements in an on state, and in an entirety of a period where the one of the main restriction elements is in an on state, the control circuit controls the sub restriction elements in an off state.

2. The power converter according to claim 1, wherein all of the sub restriction elements and the end sub-restriction element are provided by the rectification elements, the power converter is configured to boost or inversion-boost a voltage inputted from the pair of low-voltage terminals and to output the voltage from the pair of high-voltage terminals, the control circuit controls each of the main restriction elements such that each main restriction element is in the on state and then in the off state only for a predetermined charge transmission period, and at least one main restriction element is in the on state.

3. The power converter according to claim 1, wherein all of the sub restriction elements and the end sub-restriction element are provided by the switches, the power converter is configured to have one of a first operation state in which a voltage inputted from the pair of low-voltage terminals is boosted or inversion-boosted, and outputted from the pair of high-voltage terminals, and a second operation state in which a voltage inputted from the pair of high-voltage terminals is bucked and outputted from the pair of low-voltage terminals, the control circuit controls each of the main restriction elements such that each main restriction element is in the on state and then in the off state only for a predetermined charge transmission period, and at least one of the main restriction element is in the on state, and the control circuit controls the sub restriction elements connected between an M-th storage circuit and the storage circuit subsequent to the M-th storage circuit to one of the on state and the off state opposite to the state of the main restriction element connected to the M-th storage circuit, in which M is any one of 1 to N.

4. The power converter according to claim 1, further comprising:

a snubber circuit including a snubber first rectification element, a snubber storage element, and a snubber second rectification element, the snubber first rectification element and the snubber storage element being connected in series such that an intermediate node between the snubber first rectification element and the snubber storage element is interposed between the branch node of one of the main current paths and the branch node of another one of the main current paths, the snubber second rectification element being connected between an upper terminal of the storage element on a lowest stage of the second storage circuit and the intermediate node, wherein in a case where the first high-voltage terminal has a potential higher than a potential of the second high-voltage terminal, an anode of the snubber first rectification element is connected to one of the main current paths and an anode of the snubber second rectification element is connected to the intermediate node, in a case where the first high-voltage terminal has a potential lower than a potential of the second high-voltage terminal, a cathode of the snubber first rectification element is connected to one of the main current paths, and a cathode of the snubber second rectification element is connected to the intermediate node, and in a case where the snubber circuit is connected to the main current path corresponding to the second storage circuit, a terminal of the snubber first rectification element opposite to a terminal connected to the intermediate node is connected to the main current path corresponding to the second storage circuit.

5. The power converter according to claim 1, wherein the magnetic part is an inductor.

6. The power converter according to claim 1, wherein the magnetic parts of the main current paths share a magnetic core with each other.

7. The power converter according to claim 1, further comprising:

a pair of intermediate terminals including a first intermediate terminal and a second intermediate terminal, the first intermediate terminal being commonly connected to one of the first low-voltage terminal, the second low-voltage terminal, the first high-voltage terminal and the second low-voltage terminal;

a smoothing storage element being connected between the pair of intermediate terminals; and an intermediate sub-restriction element for leading out an intermediate output, the intermediate sub-restriction element being connected to the upper terminal or the lower terminal of one of the storage elements of one of the storage circuits and the second intermediate terminal, the intermediate sub-restriction element being connected in a same polarity as that of the end sub-restriction element.

8. A power converter comprising:

a pair of low-voltage terminals including a first low-voltage terminal and a second low-voltage terminal;

a pair of high-voltage terminals including a first high-voltage terminal and a second high-voltage terminal, the second high-voltage terminal being commonly connected to the second low-voltage terminal;

N systems of main current paths disposed between the first low-voltage terminal and the second low-voltage terminal, wherein N is an integer being 2 or more, each of the main current paths includes a magnetic part storing magnetic energy and a main restriction element restricting a conduction current, the magnetic part and the main restriction element are connected in series to each other through a branch node;

a plurality of storage circuits correspondingly provided for the main current paths, each of the storage circuits including one or more storage elements being stacked to one or more stages and being connected in series, each of the storage circuits having a lower end being connected to the branch node of a corresponding one of the main current paths;

a plurality of sub restriction elements each being connected between a terminal of the storage element of one of the storage circuits and a terminal of the storage element of another one of the storage circuits;

a smoothing storage element connected between the first high-voltage terminal and the second high-voltage terminal;

an end sub-restriction element, one end of which being connected to the first high-voltage terminal; and a control circuit controlling at least one of the main restriction elements, the sub restriction elements, and the end sub-restriction element, wherein the N-systems of the main current paths and the storage circuits correspondingly connected to the main current paths are assigned with a sequential order from a first to an N-th, a lower terminal of the storage element of each stage of the first storage circuit is connected to an upper terminal of the storage element of a corresponding stage of the second storage circuit through a corresponding one of the sub restriction elements, an upper terminal of the storage element of each stage of each of the second to N-th storage circuits, except for the storage element being connected to the end sub-restriction element, is connected to an upper terminal of the storage element of a corresponding stage of a subsequent storage circuit through a corresponding one of the sub restriction elements, the sub restriction elements are connected to one another through terminals thereof to define a series path of the sub restriction elements so that the sub restriction elements can be sequentially followed in a same polarity, the series path begins from the sub restriction element, one end of which is connected to the lower end of the first storage circuit, and ends by another one of the sub restriction elements, the end sub-restriction element is connected between an upper terminal of the another one of the sub restriction elements ending the series path and the first high-voltage terminal, through the series path, the upper terminals of all of the storage elements of the first to the N-th storage circuits are followed from the storage element on a lowest stage to the storage element on a highest stage in a predetermined order, the sub restriction elements defining the series path are connected to have a predetermined connection polarity so that electric power is transmitted in a predetermined direction between the pair of low-voltage terminals and the pair of high-voltage terminals by transferring electric charge between the storage elements of the adjacent storage circuits, all of the main restriction elements are provided by rectification elements, all of the sub restriction elements and the end sub-restriction element are provided by switches, and the control circuit periodically switches an on state and an off state of the sub restriction elements such that, among the sub restriction elements, the sub restriction elements connected to a same storage circuit are kept in a same on or off state.

9. The power converter according to claim 8, wherein the power converter is configured to buck a voltage inputted from the pair of high-voltage terminals and output the voltage from the pair of low-voltage terminals, the sub restriction elements and the end sub-restriction element are sorted into a first to an N-th sub-restriction element groups such that the sub restriction elements and the end sub-restriction element having the terminals connected to a same storage element are included in a same sub-restriction element group, and the control circuit controls each of the sub-restriction element groups such that the each sub-restriction element group is in an off state and is then in an on state only for a predetermined charge transmission period, and at least one sub-restriction element group is in an off state.

10. The power converter according to claim 8, wherein
the magnetic part is an inductor.

11. The power converter according to claim 8, wherein
the magnetic parts of the main current paths share a magnetic core with each other.

12. The power converter according to claim 8, further comprising:

a pair of intermediate terminals including a first intermediate terminal and a second intermediate terminal, the first intermediate terminal being commonly connected to one of the first low-voltage terminal, the second low-voltage terminal, the first high-voltage terminal and the second low-voltage terminal;

a smoothing storage element being connected between the pair of intermediate terminals; and an intermediate sub-restriction element for leading out an intermediate output, the intermediate sub-restriction element being connected to the upper terminal or the lower terminal of one of the storage elements of one of the storage circuits and the second intermediate terminal, the intermediate sub-restriction element being connected in a same polarity as that of the end sub-restriction element.

* * * * *